(12) United States Patent
Luo et al.

(10) Patent No.: US 12,516,049 B2
(45) Date of Patent: Jan. 6, 2026

(54) SULFONYLUREA RING SUBSTITUTED MONOCYCLIC β-LACTAM ANTIBIOTICS

(71) Applicant: SUZHOU ERYE PHARMACEUTICAL CO., LTD, Suzhou (CN)

(72) Inventors: Wei Luo, Shanghai (CN); Zhigang Huang, Shanghai (CN); Charles Z. Ding, Shanghai (CN); Jian Li, Shanghai (CN); Shuhui Chen, Shanghai (CN)

(73) Assignee: SUZHOU ERYE PHARMACEUTICAL CO., LTD, Suzhou (CN)

( * ) Notice: Subject to any disclaimer, the term of this patent is extended or adjusted under 35 U.S.C. 154(b) by 849 days.

(21) Appl. No.: 17/777,704

(22) PCT Filed: Nov. 20, 2020

(86) PCT No.: PCT/CN2020/130568
§ 371 (c)(1),
(2) Date: May 18, 2022

(87) PCT Pub. No.: WO2021/098840
PCT Pub. Date: May 27, 2021

(65) Prior Publication Data
US 2023/0037556 A1    Feb. 9, 2023

(30) Foreign Application Priority Data

Nov. 22, 2019 (CN) .......................... 201911159356.9

(51) Int. Cl.
C07D 417/14    (2006.01)
A61P 31/04    (2006.01)

(52) U.S. Cl.
CPC ............ *C07D 417/14* (2013.01); *A61P 31/04* (2018.01)

(58) Field of Classification Search
CPC .................................................. C07D 417/14
See application file for complete search history.

(56) References Cited

U.S. PATENT DOCUMENTS

| | | | |
|---|---|---|---|
| 5,317,016 A | 5/1994 | Nishitani et al. | |
| 2015/0266867 A1* | 9/2015 | Aulakh | C07D 487/04 546/270.7 |

FOREIGN PATENT DOCUMENTS

| | | | |
|---|---|---|---|
| CN | 103228652 A | 7/2013 | |
| CN | 106164072 A | 11/2016 | |
| CN | 108137573 A | 6/2018 | |
| EP | 3122745 A1 | 2/2017 | |
| JP | 5379894 B2 | 12/2013 | |
| JP | 2013544276 A | 12/2013 | |
| JP | 2017510580 A | 4/2017 | |
| JP | 2018528241 A | 9/2018 | |
| WO | 2012073138 A1 | 6/2012 | |
| WO | 2014141132 A1 | 9/2014 | |
| WO | 2015148379 A1 | 10/2015 | |
| WO | 2017050218 A1 | 3/2017 | |

OTHER PUBLICATIONS

Merriam-Webster, definition of isomer, obtained from https://www.merriam-webster.com/dictionary/isomer on Mar. 31, 2025 (Year: 2025).*
Dörwald, F. Zaragoza. Side Reactions in Organic Synthesis: A Guide to Successful Synthesis Design, Weinheim: WILEY-VCH Verlag Gmbh & Co. KGaA, 2005, Preface (Year: 2005).*
Yasuyoshiisoetal. Anovel1 -methylcarbapenemantibiotic, S-4661. SynthesisandStructure-activityRelationshipsof2-(5-SubstitutedPyr-rolidin-3-ylthio)-1 -methylcarbapenems JournalofAntibiotics (1996),49(2) 199-209.
Office Action of JP2022-529868 Mail Date Jun. 6, 2023.
Office Action of EP20890614.9 Mail Date Dec. 1, 2022.
India Application No/ 202247035296,The First Examination Report (IPO) , mail date Jul. 8, 2022.
PCT PCT/CN2020/130568—[ISA210] International Search Report, Mail Date Feb. 22, 2021.
PCT PCT/CN2020/130568—Form PCT-[ISA237] Written Opinion of the International Searching Authority Mail Date Feb. 22, 2021.

* cited by examiner

*Primary Examiner* — Matthew P Coughlin
(74) *Attorney, Agent, or Firm* — IPro, PLLC; Na Xu

(57) ABSTRACT

Sulfonylurea ring substituted monocyclic β-lactam antibiotics, and specifically relating to a compound represented by formula (I), a pharmaceutically acceptable salt or a stereoisomer thereof, and an application thereof in the preparation of medicaments for treating diseases related to bacterial infections.

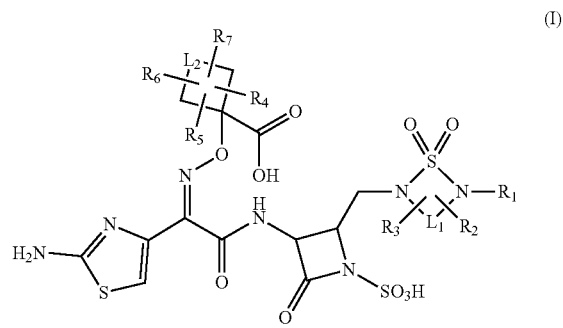

10 Claims, No Drawings

SULFONYLUREA RING SUBSTITUTED MONOCYCLIC β-LACTAM ANTIBIOTICS

The present application claims the following priority: CN201911159356.9, filed on Nov. 22, 2019.

TECHNICAL FIELD

The present disclosure relates to novel sulfonylurea ring substituted monocyclic β-lactam antibiotics, and specifically discloses a compound of formula (I), a pharmaceutically acceptable salt thereof or a stereoisomer thereof, and an application thereof in the treatment of diseases related to bacterial infections.

BACKGROUND OF THE INVENTION

Since British scientist Fleming first discovered penicillin in 1928, β-lactam antibiotics have saved countless lives, and play an increasingly important role in our daily life. With the continuous emergence of drug-resistant genes and antibiotic hydrolases such as extended-spectrum β-lactamases (ESBLs) and serine carbapenemase (KPCs), existing antibiotics become more and more powerless. Especially for severe and even multidrug resistance mediated by metallo-β-lactamases (MBLs), traditional antibiotics such as penicillin, cephalosporin, carbapenem and the like cannot cope with infections caused by these drug-resistant bacteria, bringing increasingly serious threats to human health and safety. Monocyclic β-lactam ring antibiotics represented by aztreonam are inherently stable to metallo-β-lactamases (MBLs) and are a highly advantageous chemical series.

The marketed drug aztreonam has the disadvantages of poor permeability, strong efflux and narrow antibacterial spectrum. In order to overcome these clinical problems, the strategy of enhancing permeability through siderophores has been introduced. For example, Basilea (WO 2007065288) and Naeja Pharmaceuticals (WO 2002022613) reported corresponding series of molecules; recently Novartis (WO 2015148379) reported the study of overcoming drug resistance by modifying the substituents of the aztreonam molecule, and the formula of the compounds are shown below, where the group Het is a heteroaromatic ring or a heterocycle substituted with 1-2 heteroatoms.

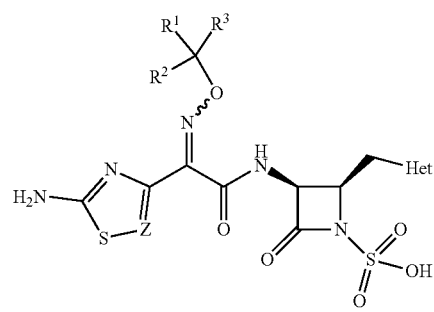

(I)

In view of the severe situation of drug resistance, it is an urgent task to develop a new generation of monocyclic β-lactam antibiotics to solve the current drug resistance problem. The sulfonylurea ring substituted monocyclic β-lactam antibiotics in the present disclosure have the corresponding potentials.

SUMMARY OF THE INVENTION

The present disclosure provides a compound of formula (I), an isomer thereof or a pharmaceutically acceptable salt thereof,

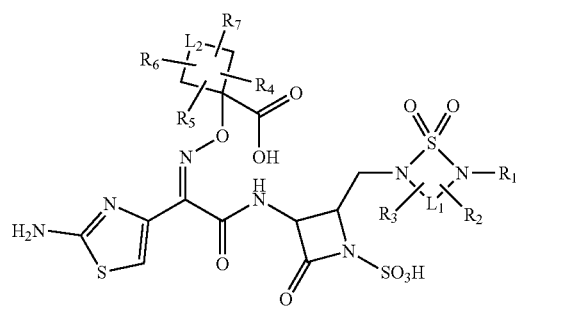

(I)

wherein
$L_1$ is selected from —$CH_2CH_2$—, —$CH_2CH_2CH_2$—, —$C(=O)CH_2$—, —$C(=O)CH_2CH_2$—, and —$CH_2C(=O)CH_2$—;
$L_2$ is selected from a single bond and —$CH_2$—;
$R_1$ is selected from H, CN, and $C_{1-3}$ alkyl, wherein $C_{1-3}$ alkyl is optionally substituted with one, two or three $R_a$;
$R_2$ and $R_3$ are each independently selected from H, OH, $C_{1-6}$ alkyl, $C_{1-6}$ alkoxy, —$CH_2$—O—C(=O)—$C_{1-3}$ alkyl, —$CH_2$—NH—$C_{1-3}$ alkyl, —$CH_2$—NH—C(=NH)$NH_2$, and —$CH_2$—NH—C(=O)—$C_{1-3}$ alkyl, wherein $C_{1-6}$ alkyl, $C_{1-6}$ alkoxy, —$CH_2$—O—C(=O)—$C_{1-3}$ alkyl, —$CH_2$—NH—$C_{1-3}$ alkyl, —$CH_2$—NH—C(=NH)$NH_2$, and —$CH_2$—NH—C(=O)—$C_{1-3}$ alkyl are optionally substituted with one, two or three $R_b$;
$R_4$, $R_5$, $R_6$, and $R_7$ are each independently selected from H, F, Cl, Br, I, $CH_3$, $CH_2CH_3$, $CF_3$, $CHF_2$, and $CH_2F$;
$R_a$ and $R_b$ are each independently selected from F, Cl, Br, I, OH, CN, COOH, $CH_3$, $CH_2CH_3$, $CH_2CH_2CH_3$, $CH(CH_3)_2$, $OCH_3$, $OCF_3$, $CHF_2$, $CH_2F$, and $NH_2$.

In some embodiments of the present disclosure, the above-mentioned $R_1$ is selected from H, CN, and $CH_3$, and other variables are as defined in the present disclosure.

In some embodiments of the present disclosure, the above-mentioned $R_2$ and $R_3$ are each independently selected from H, OH, $C_{1-3}$ alkyl, $C_{1-3}$ alkoxy,

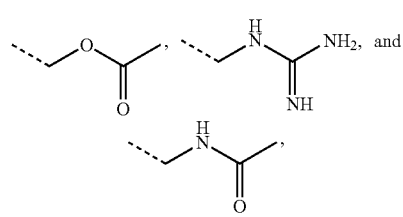

wherein $C_{1-3}$ alkyl, $C_{1-3}$ alkoxy,

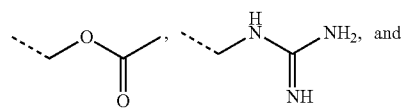

-continued

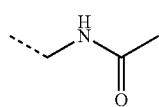

are optionally substituted with one, two or three $R_b$, and other variables are as defined in the present disclosure.

In some embodiments of the present disclosure, the above-mentioned $R_2$ and $R_3$ are each independently selected from H, $CH_3$,

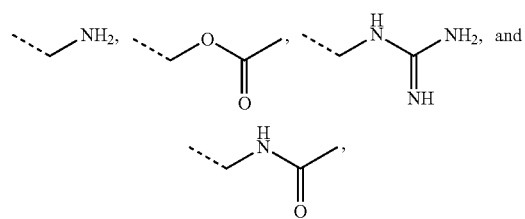

and other variables are as defined in the present disclosure.

In some embodiments of the present disclosure, the above-mentioned structural unit

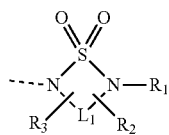

is selected from

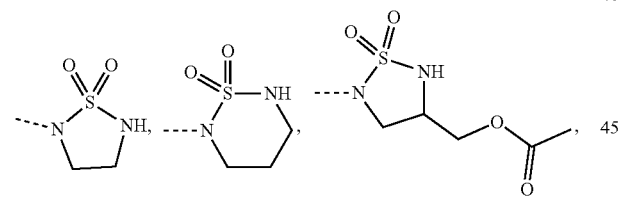

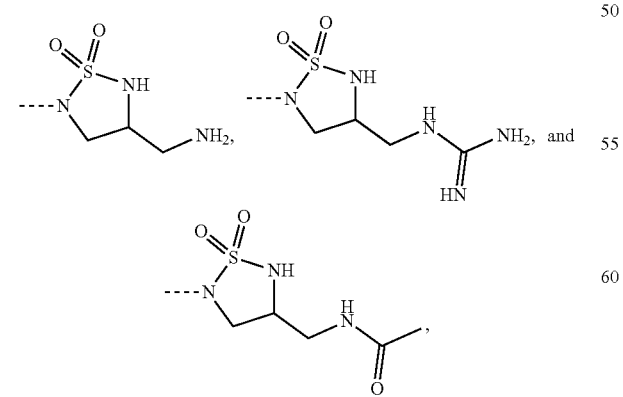

and other variables are as defined in the present disclosure.

In some embodiments of the present disclosure, the above-mentioned structural unit

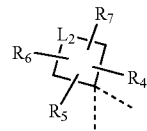

is selected from

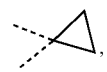

and other variables are as defined in the present disclosure.

In some embodiments of the present disclosure, among the above-mentioned compound, the isomer thereof or the pharmaceutically acceptable salt thereof, the compound is selected from

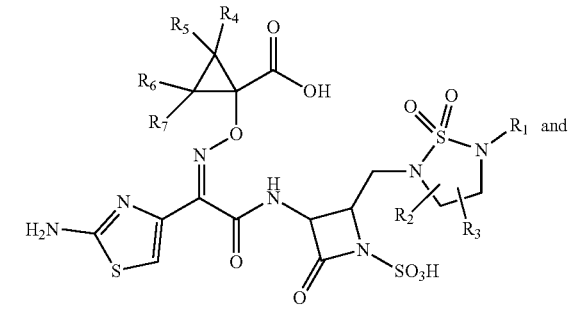

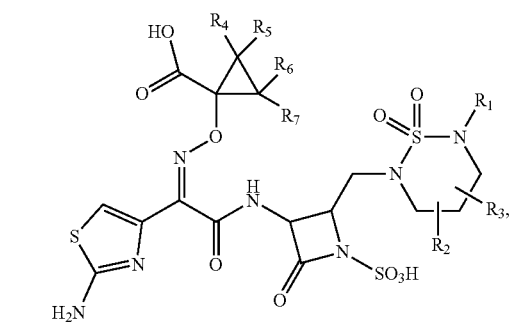

wherein $R_1$, $R_2$, $R_3$, $R_4$, $R_5$, $R_6$, and $R_7$ are as defined in the present disclosure.

In some embodiments of the present disclosure, among the above-mentioned compound, the isomer thereof or the pharmaceutically acceptable salt thereof, the compound is selected from

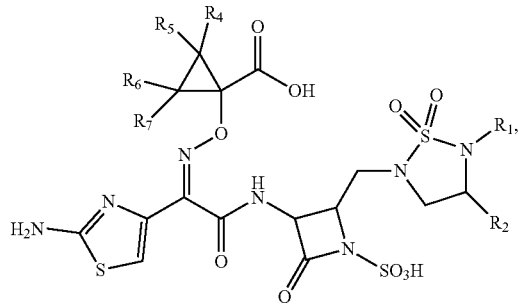

(I-3)

wherein $R_1$, $R_2$, $R_4$, $R_5$, $R_6$, and $R_7$ are as defined in the present disclosure.

The present disclosure also provides a compound of the following formula, an isomer thereof or a pharmaceutically acceptable salt thereof, which are selected from

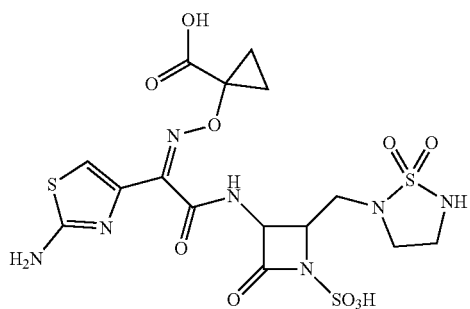

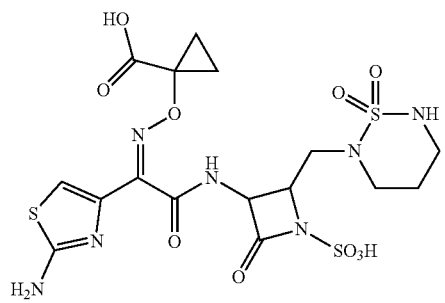

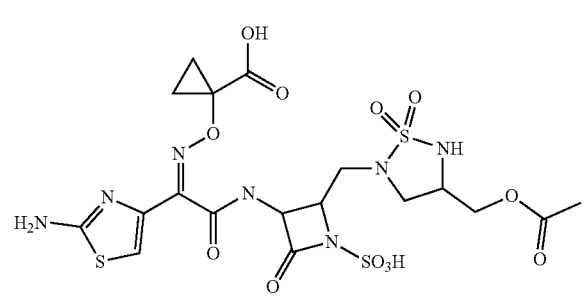

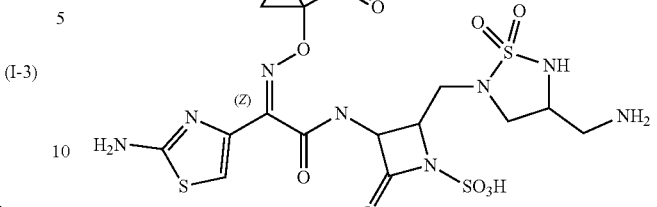

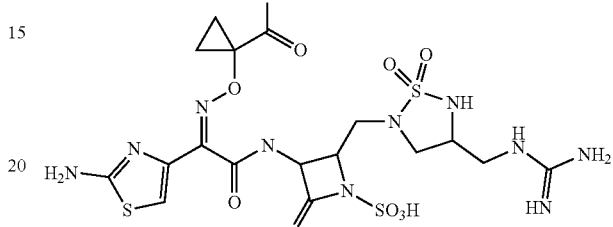

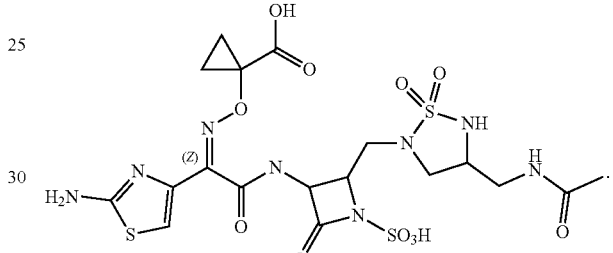

In some embodiments of the present disclosure, the above-mentioned compound, the isomer thereof or the pharmaceutically acceptable salt thereof is selected from

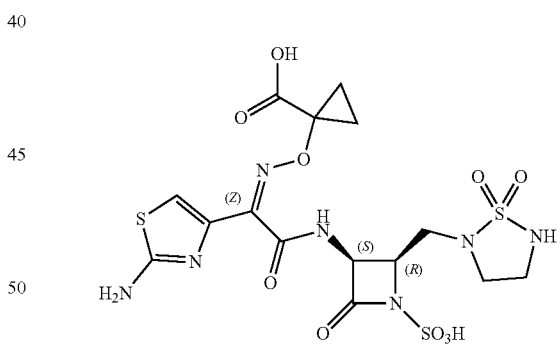

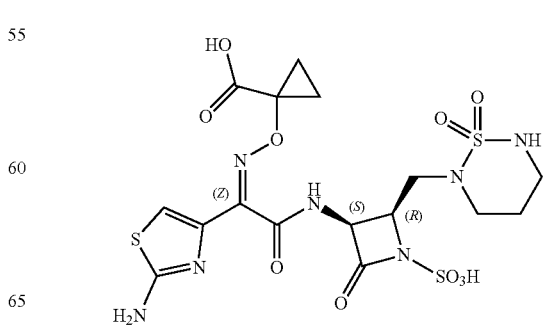

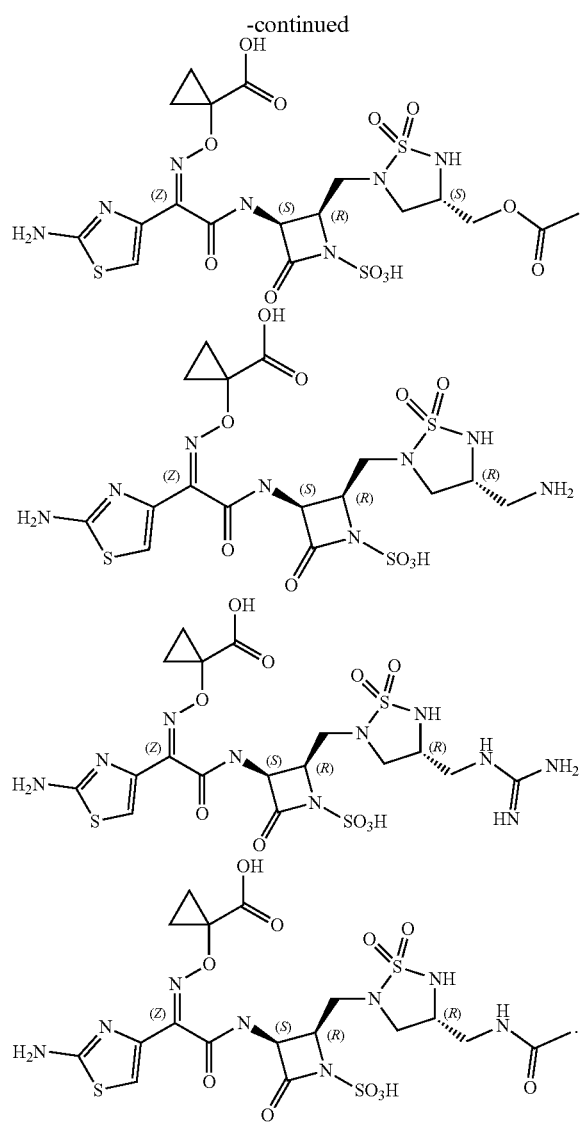

The present disclosure also provides an application of the above-mentioned compound, the isomer thereof or the pharmaceutically acceptable salt thereof in the preparation of medicaments for treating diseases related to bacterial infections.

The present disclosure also provides some embodiments by combining any of the above-mentioned variables.

Technical Effect

The compound of the present disclosure is provided with a relatively strong antibacterial activity, especially for bacteria producing various β-lactamases, with a good water solubility, and can be used for preparing medicaments for treating diseases related to bacterial infections.

Definitions and Description

Unless otherwise specified, the following terms and phrases used herein are intended to have the following meanings. A specific term or phrase should not be considered indefinite or unclear in the absence of a particular definition, but should be understood in the ordinary sense. When a trade name appears herein, it is intended to refer to its corresponding commodity or active ingredient thereof.

The term "pharmaceutically acceptable" used therein is in terms of those compounds, materials, compositions, and/or dosage forms, which are suitable for use in contact with human and animal tissues within the scope of reliable medical judgment, with no excessive toxicity, irritation, allergic reaction or other problems or complications, commensurate with a reasonable benefit/risk ratio.

The term "pharmaceutically acceptable salt" refers to a salt of the compound of the present disclosure that is prepared by reacting the compound with a specific substituent discovered in the present disclosure with a relatively non-toxic acid or base. When the compound of the present disclosure contains a relatively acidic functional group, a base addition salt can be obtained by bringing a sufficient amount of base into contact with the compound in a pure solution or a suitable inert solvent. The pharmaceutically acceptable base addition salt includes a salt of sodium, potassium, calcium, ammonium, organic amine or magnesium or similar salts. When the compound of the present disclosure contains a relatively basic functional group, an acid addition salt can be obtained by bringing a sufficient amount of acid into contact with the compound in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluene sulfonic acid, citric acid, tartaric acid, and methanesulfonic acid, and the like; and an salt of amino acid (such as arginine and the like), and a salt of an organic acid such as glucuronic acid and the like. Certain specific compounds of the present disclosure that contain basic and acidic functional groups can be converted to any base or acid addition salt.

The pharmaceutically acceptable salt of the present disclosure can be prepared from the parent compound that contains an acidic or basic moiety by conventional chemical method. Generally, such salt can be prepared by reacting the free acid or base form of the compound with a stoichiometric amount of an appropriate base or acid in water or an organic solvent or a mixture thereof.

The compound of the present disclosure may have a specific geometric or stereoisomeric form. The present disclosure contemplates all such compounds, including cis and trans isomer, (−)- and (+)-enantiomer, (R)- and (S)-enantiomer, diastereoisomer, (D)-isomer, (L)-isomer, a racemic mixture thereof, and other mixtures, for example, an enantiomer or diastereoisomer enriched mixture, all of which are encompassed within the scope of the present disclosure. The substituent such as alkyl may have an additional asymmetric carbon atom. All these isomers and mixtures thereof are encompassed within the scope of the present disclosure.

Unless otherwise specified, the terms "enantiomer" or "optically isomers" refer to stereoisomers that are mirror images of each other.

Unless otherwise specified, the term "cis-trans isomer" or "geometric isomer" is caused by the fact that double bonds or single bonds of ring-forming carbon atoms cannot rotate freely.

Unless otherwise specified, the term "diastereomers" refers to stereoisomers in which molecules have two or more chiral centers and are not mirror images of each other.

Unless otherwise specified, "(D)" or "(+)" means dextrorotatory, "(L)" or "(−)" means levorotatory, and "(DL)" or "(±)" means racemic.

Unless otherwise specified, the wedge-shaped solid bond (◢) and the wedge-shaped dotted bond (⋰⋰) represent the absolute configuration of a stereoscopic center, the straight solid bond (◢) and straight dotted bond (⋰⋰⋰) represent the relative configuration of a stereoscopic center, the wavy line (∿) represents the wedge-shaped solid bond (◢) or the wedge-shaped dotted bond (⋰⋰⋰); or the wavy line (∿) represents the straight solid bond (◢) and the straight dotted bond (⋰⋰⋰).

Unless otherwise specified, when there is a double bond structure in the compound, such as a carbon-carbon double bond, a carbon-nitrogen double bond, and a nitrogen-nitrogen double bond, and each atom on the double bond is connected to two different substituents (in a double bond containing a nitrogen atom, a lone pair of electrons on the nitrogen atom is regarded as a substituent connected to it), if the atom on the double bond in the compound and its substituent are connected by the wavy line (∿), it represents the (Z) isomer, (E) isomer or a mixture of two isomers of the compound. For example, the following formula (A) indicates that the compound is in the form of a single isomer of formula (A-1) or formula (A-2), or a mixture of two isomers of formula (A-1) and formula (A-2); the following formula (B) indicates that the compound is in the form of a single isomer of formula (B-1) or formula (B-2), or a mixture of two isomers of formula (B-1) and formula (B-2). The following formula (C) indicates that the compound is in the form of a single isomer of formula (C-1) or formula (C-2), or a mixture of two isomers of formula (C-1) and formula (C-2).

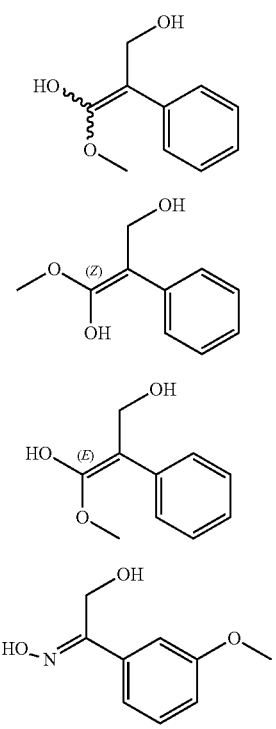

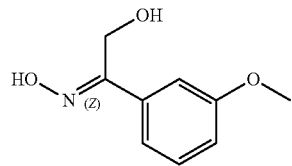

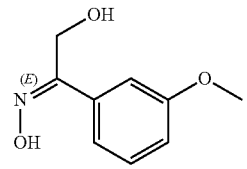

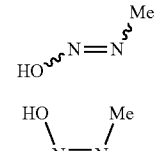

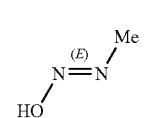

The compounds of the present disclosure may exist in specific. Unless otherwise specified, the term "tautomer" or "tautomeric form" means that at room temperature, isomers with different functional groups are in a dynamic equilibrium and can be quickly converted to each other. If tautomerization is possible (such as in solution), a chemical equilibrium of tautomers can be achieved. For example, proton tautomers (also known as prototropic tautomers) include interconversion via migration of a proton, such as keto-enol isomerization and imine-enamine isomerization. Valence tautomers include interconversion by recombination of some bond-forming electrons. A specific example of keto-enol tautomerization is the interconversion between two tautomers, pentane-2,4-dione and 4-hydroxypent-3-en-2-one.

Unless otherwise specified, the terms "rich in one isomer", "isomer enriched", "rich in one enantiomer", or "enantiomer enriched" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomer excess" refers to the difference between the relative percentages of two isomers or two enantiomers. For example, if the content of one isomer or enantiomer is 90%, and the content of the other isomer or enantiomer is 10%, the isomer or enantiomer excess (ee value) is 80%.

Optically active (R)- and (S)-isomers and D and L isomers can be prepared using chiral synthesis or chiral reagents or other conventional techniques. If a particular enantiomer of a compound of the present disclosure is desired, it can be prepared by asymmetric synthesis or derivatization with a chiral auxiliary, wherein the resulting diastereomeric mixture is separated and the auxiliary groups are cleaved to provide pure desired enantiomers. Alternatively, where the molecule contains a basic functional group (such as an amino group) or an acidic functional group (such as a carboxyl group), diastereomeric salts can be formed with an appropriate optically active acid or base, followed by resolution of the diastereomers using conventional methods well known in the art, and subsequent recovery of the pure enantiomers. In addition, separation of enantiomers and diastereomers is frequently accomplished using chromatography, which uses chiral stationary phases, optionally in combination with chemical derivatization methods (e.g., formation of carbamates from amines). The compounds of the present disclosure may contain unnatural proportions of atomic isotopes at one or more of the atoms constituting the compound. For example, the compounds may be radiolabeled with radioactive isotopes, such as tritium ($^3$H), iodine-125 ($^{125}$I), or C-14 ($^{14}$C). For another example, the hydrogen can be substituted by heavy hydrogen to form deuterated drugs. The bond formed by deuterium and carbon is stronger than the bond formed by ordinary hydrogen and carbon. Compared with undeuterated drugs, deuterated drugs have reduced toxic side effects, increased drug stability, enhanced efficacy, prolonged biological half-life of drugs, and other advantages. All isotopic variations of the compounds of the present disclosure, whether radioactive or not, are encompassed within the scope of the present disclosure. "Optional" or "optionally" means that the subsequently described event or circumstance may, but not necessarily occur, and that the description includes instances where said event or circumstance occurs and instances where said event or circumstance does not occur.

The term "substituted" means that any one or more hydrogen atoms on the designated atom is substituted by a substituent, which may include heavy hydrogen and hydrogen variants, provided that the valence state of the designated atom is normal, and the substituted compound is stable. Where the substituent is oxygen (i.e., =O), it means that two hydrogen atoms are substituted. Oxygen substitution does not occur on aromatic groups. The term "optionally substituted" means that it may or may not be substituted. Unless otherwise specified, the type and number of substituents may be arbitrary on the basis that they can be achieved in chemistry.

When any variable (such as R) appears more than once in the composition or structure of a compound, its definition in each case is independent. Thus, for example, if a group is substituted with 0-2 R, the group can optionally be substituted with up to two R, and R in each case has independent options. In addition, combinations of substituents and/or variants thereof are permissible only if such combinations result in stable compounds.

When the number of a linking group is 0, such as —(CRR)$_0$—, it means that the linking group is a single bond.

When one of the variables is selected from a single bond, it means that the two groups to which it is connected are directly connected. For example, when L represents a single bond in A-L-Z, it means that the structure is actually A-Z.

When a substituent is vacant, it means that the substituent does not exist. For example, when X is vacant in A-X, it means that the structure is actually A. When the substituents listed do not indicate through which atom they are connected to the substituted group, such substituents can be bonded through any of the atoms thereof, for example, pyridyl as a substituent can be attached to the substituted group via any carbon atom on the pyridine ring.

When the linking group listed does not indicate the linking direction thereof the linking direction thereof is arbitrary. For example, the linking group L is -M-W— in

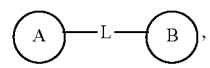

at this situation, -M-W— can connect ring A and ring B in the same direction as the reading order from left to right to form

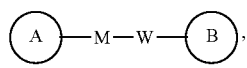

and can also connect ring A and ring B in the opposite direction as the reading order from left to right to form

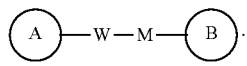

Combinations of the linking groups, substituents, and/or variants thereof are permissible only if such combinations result in stable compounds.

Unless otherwise specified, when a group has one or more connectable sites, any one or more sites of the group can be connected to other groups through chemical bonds. The chemical bonds between the sites and other groups can be represented by a straight solid bond ( ⟋ ), a straight dashed bond ( ⸺ ), or a wavy line ( ⸻ ). For example, the straight solid bond in —OCH$_3$ means that the group is connected to other groups through the oxygen atom in the group; the straight dashed bond in

means that the group is connected to other groups through the two ends of the nitrogen atom in the group; the wavy line in

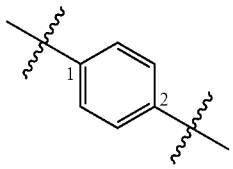 [SMILES: *c1ccc(*)cc1]

means that the group is connected to other groups through the 1 and 2 carbon atoms in the phenyl group.

Unless otherwise specified, the term "C$_{1-6}$ alkyl" is used to represent a linear or branched saturated hydrocarbon group consisting of 1 to 6 carbon atoms. The C$_{1-6}$ alkyl includes C$_{1-5}$, C$_{1-4}$, C$_{1-3}$, C$_{1-2}$, C$_{2-6}$, C$_{2-4}$, C$_6$, and C$_5$ alkyl, and the like; It can be monovalent (such as methyl), divalent (such as methylene), or multivalent (such as methine). Examples of C$_{1-6}$ alkyl include, but are not limited to, methyl (Me), ethyl (Et), propyl (including n-propyl and isopropyl), butyl (including n-butyl, isobutyl, s-butyl and t-butyl), pentyl (including n-pentyl, isopentyl and neopentyl), hexyl, and the like.

Unless otherwise specified, the term "$C_{1-3}$ alkyl" is used to represent a linear or branched saturated hydrocarbon group consisting of 1 to 3 carbon atoms. The $C_{1-3}$ alkyl group includes $C_{1-2}$, $C_{2-3}$ alkyl, and the like; it can be monovalent (such as methyl), divalent (such as methylene) or multivalent (such as methine). Examples of $C_{1-3}$ alkyl include, but are not limited to, methyl (Me), ethyl (Et), propyl (including n-propyl and isopropyl), and the like.

Unless otherwise specified, the term "$C_{1-6}$ alkoxy" represents those alkyl groups containing 1 to 6 carbon atoms that are connected to the rest of the molecule through one oxygen atom. The $C_{1-6}$ alkoxy includes $C_{1-4}$, $C_{1-3}$, $C_{1-2}$, $C_{2-6}$, $C_{2-4}$, $C_6$, $C_5$, $C_4$, and $C_3$ alkoxy, and the like. Examples of $C_{1-6}$ alkoxy include, but are not limited to, methoxy, ethoxy, propoxy (including n-propoxy and isopropoxy), butoxy (including n-butoxy, isobutoxy, s-butoxy and t-butoxy), pentyloxy (including n-pentyloxy, isopentyloxy and neopentyloxy), hexyloxy, and the like.

Unless otherwise specified, the term "$C_{1-3}$ alkoxy" represents those alkyl groups containing 1 to 3 carbon atoms that are connected to the rest of the molecule through one oxygen atom. The $C_{1-3}$ alkoxy includes $C_{1-2}$, $C_{2-3}$, $C_3$, and $C_2$ alkoxy, and the like. Examples of $C_{1-3}$ alkoxy include, but are not limited to, methoxy, ethoxy, propoxy (including n-propoxy and isopropoxy), and the like.

The structure of the compound of the present disclosure can be confirmed by conventional methods known to those skilled in the art, and if the present disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/ω scan, and after collecting the relevant data, the crystal structure can be further analyzed by direct method (Shelxs97).

The solvents used in the present disclosure are commercially available.

The present disclosure uses the following abbreviations: aq refers to water; HOBT refers to 1-hydroxybenzotriazole; HBTU refers to benzotriazole-N,N,N',N'-tetramethyl urea hexafluorophosphate; HATU refers to O-(7-azabenzotriazol-1-yl)-N,N,N',N'-tetramethyluronium hexafluorophosphate; EDCI refers to N-(3-dimethylaminopropyl)-N'-ethylcarbodiimide hydrochloride; DCC refers to dicyclohexylcarbodiimide; eq refers to equivalent; DCM refers to dichloromethane; PE refers to petroleum ether; DMF refers to N,N-dimethylformamide; EtOAc refers to ethyl acetate; EtOH refers to ethanol; MeOH refers to methanol; CBz refers to benzyloxycarbonyl, an amine protecting group; BOC refers to tert-butoxycarbonyl, an amine protecting group; HOAc refers to acetic acid; THF refers to tetrahydrofuran; Boc$_2$O refers to di-tert-butyldicarbonate; TFA refers to trifluoroacetic acid; DIPEA refers to diisopropylethylamine; TBAF refers to tetrabutylammonium fluoride; iPrOH refers to 2-propanol.

The compounds are named according to the conventional naming principles in the art or by ChemDraw® software, and the commercially available compounds use the supplier catalog names.

DETAILED DESCRIPTION OF THE PREFERRED EMBODIMENTS

The present disclosure is described in detail by the embodiments below, but it does not mean that there are any adverse restrictions to the present disclosure. The compounds of the present disclosure can be prepared by a variety of synthetic methods known to those skilled in the art, including the specific embodiments listed below, embodiments resulting from their combination with other chemical synthesis methods, and equivalent substitutions known to those skilled in the art, preferred embodiments including, but not limited to, embodiments of the present disclosure. It will be apparent to those skilled in the art that various variations and improvements can be made to specific embodiments of the present disclosure without departing from the spirit and scope of the present disclosure.

General Synthetic Routes:

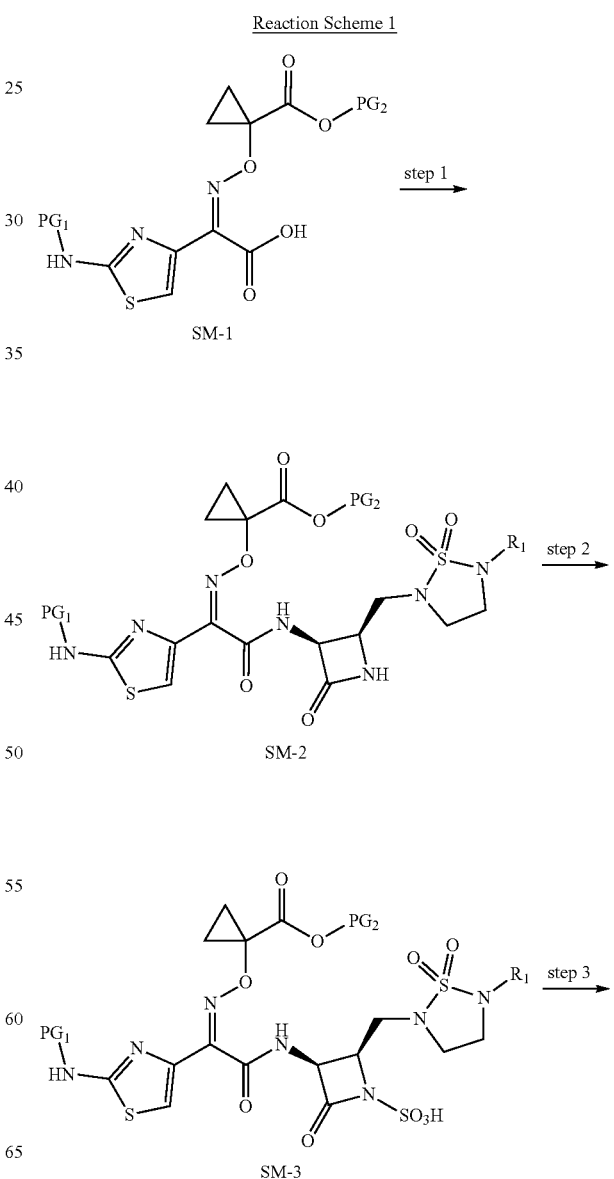

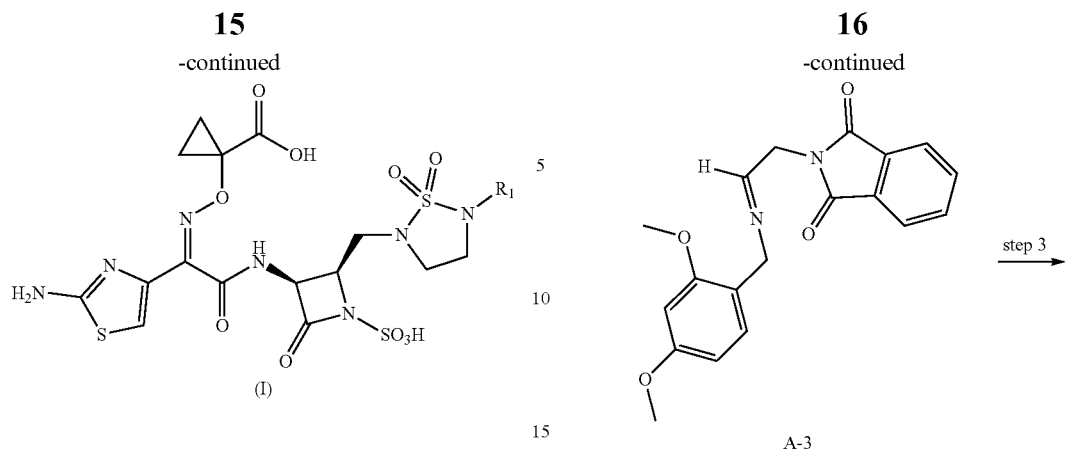

(I)

PG₁ is a common amine protecting group, such as triphenylmethyl, tert-butoxycarbonyl, and the like; PG₂ is a common carboxyl protecting group, such as diphenyl methyl, tert-butyl, and the like. All other variables are as defined in the present disclosure, and the compound of formula (I) can be prepared from the reaction intermediate SM-1 in three steps. Specifically, step 1 is an acid-amine condensation reaction, usually performed under the action of a condensing agent such as HOBT, EDCI, HATU, HBTU, DCC and an appropriate amount of alkali at a low temperature such as 0-20° C.; step 2 is a sulfonic acid introducing reaction, usually performed by reacting substrate SM-2 under the action of a sulfonating agent such as DMF SO₃, pyridine SO₃ in DMF solvent at a low temperature, preferably at a temperature ranging from 0-10° C.; step 3 is a deprotection reaction, usually performed under the action of an acid, commonly used acids including trifluoroacetic acid, formic acid, and the like, with dichloromethane as solvent, anisole helping to remove the protecting group, and the preferred reaction temperature ranging from −10-10° C.

PREPARATION OF INTERMEDIATE

Synthesis Route 1 of Intermediate

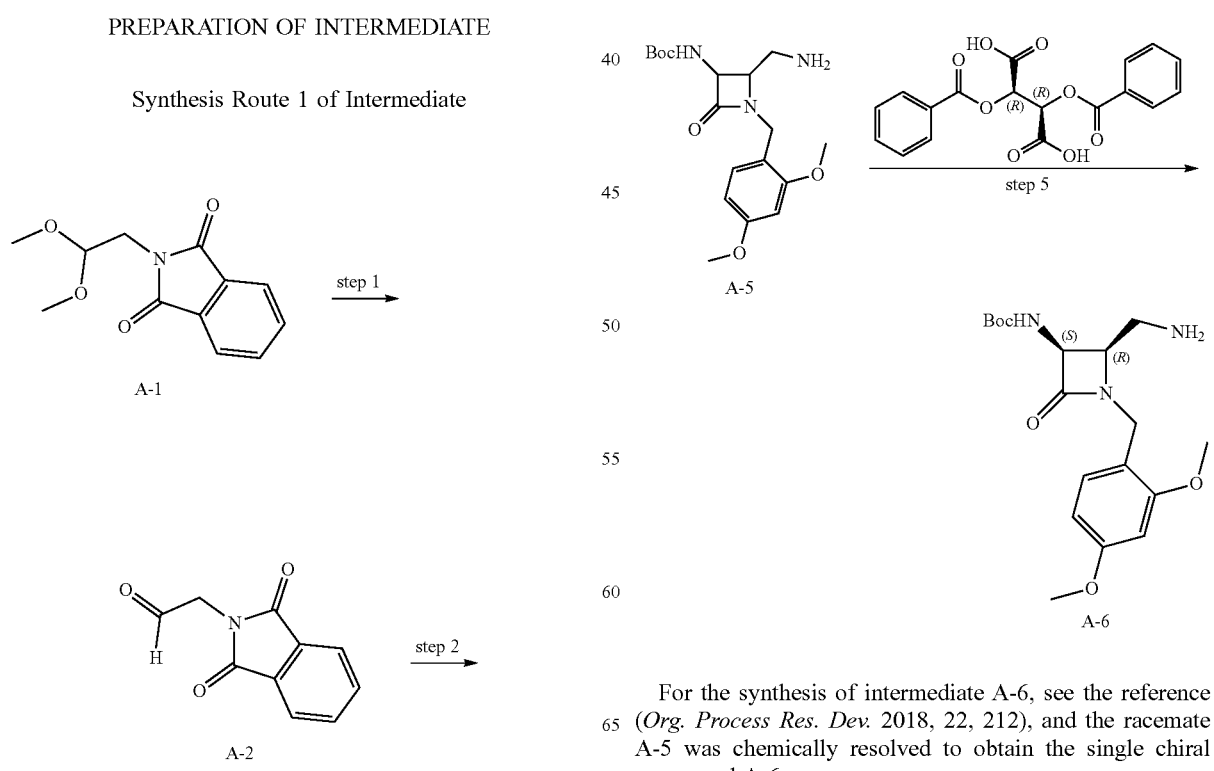

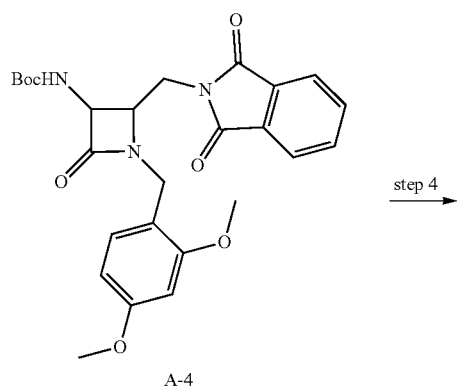

For the synthesis of intermediate A-6, see the reference (*Org. Process Res. Dev.* 2018, 22, 212), and the racemate A-5 was chemically resolved to obtain the single chiral compound A-6.

Synthesis Route 2 of Intermediate

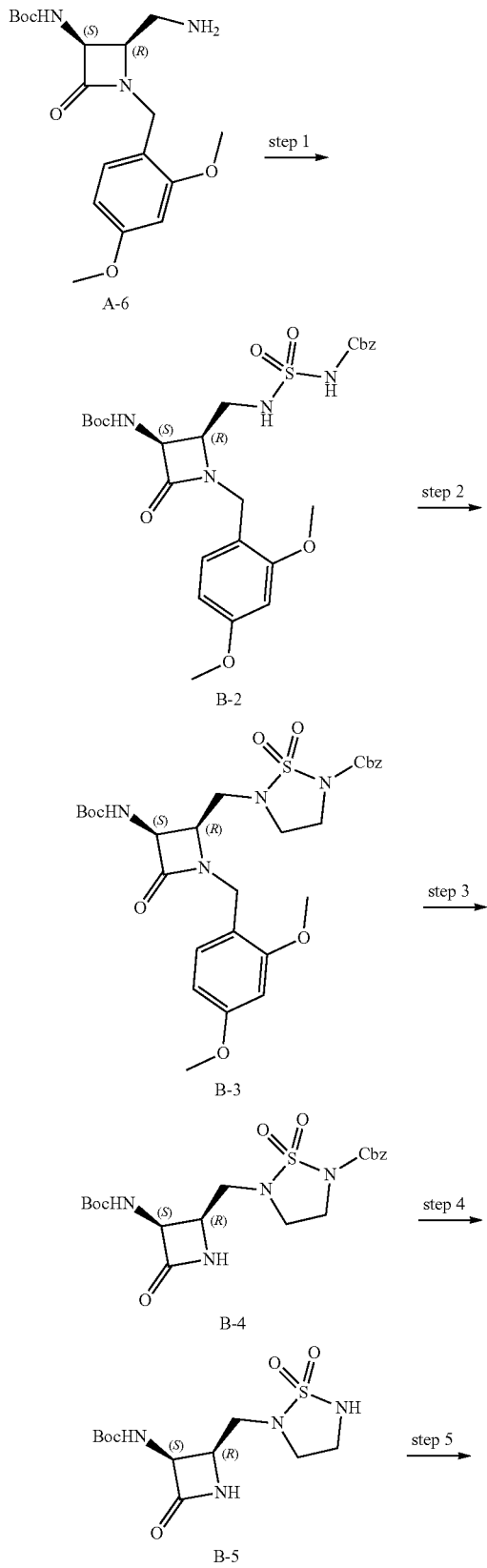

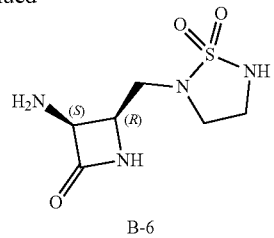

Step 1: Preparation of Compound B-2

A-6 (3.8 g, 10.40 mmol, 1 eq) and triethylamine (2.10 g, 20.80 mmol, 2.89 mL, 2 eq) were dissolved in a dichloromethane (30 mL) solution, a solution of (chlorosulfonyl) carbamate acid benzyl ester (2.60 g, 10.40 mmol, 1 eq) in dichloromethane (30 mL) was added dropwise at 0° C., and the mixture was stirred at 10-20° C. for 1 hour. The reaction mixture was washed with water (40 mL), stirred for 5 minutes, and extracted with dichloromethane (30 mL). The combined organic phase was washed with brine (30 mL), dried over anhydrous $Na_2SO_4$, filtered, and concentrated in vacuo to obtain compound B-2 (6.0 g) LCMS (ESI) m/z: 579.2 (M+1).

Step 2: Preparation of Compound B-3

Compound B-2 (6 g, 10.37 mmol, 1 eq) was dissolved in MeCN (60 mL), and 1,2-dibromoethane (3.90 g, 20.74 mmol, 1.56 mL, 2 eq) and $K_3PO_4$ (4.40 g, 20.74 mmol, 2 eq) were added to the solution at a time under $N_2$ protection at 10-20° C. The mixture was stirred at 60° C. for 14 hours, 1,2-dibromomethane (1.95 g, 10.37 mmol, 782.32 µL, 1 eq) was supplementarily added, and the mixture was stirred at 90° C. for another 8 hours. The mixture was filtered and concentrated under reduced pressure to obtain a residue. The residue was purified by silica gel chromatography (PE/EA=4:1 to 2:1, then dichloromethane/PE=50:1 to 20:1). Compound B-3 was obtained. LCMS (ESI) m/z: 477 (M+23); 399 (M-56+1).

Step 3: Preparation of Compound B-4

Compound B-3 (3.4 g, 5.62 mmol, 1 eq) was dissolved in $H_2O$ (45 mL) and MeCN (90 mL), and dipotassium hydrogen phosphate (3.92 g, 22.49 mmol, 4 eq) and potassium persulfate (6.84 g, 25.30 mmol, 4.5 eq) were added at a time under nitrogen protection at 25° C. The mixture was stirred at 100° C. for 0.5 hour. 50 mL of sodium bicarbonate aqueous solution was added to the reaction mixture and it was extracted with ethyl acetate (100 mL solution). The combined organic phase was washed with brine, dried over anhydrous $Na_2SO_4$, filtered, and concentrated in vacuo. The residue was purified by silica gel chromatography (petroleum ether/ethyl acetate (V/V, the same below)=4:1 to 1:3) to obtain compound B-4. LCMS (ESI) m/z: 399.1 (M-56+1).

Step 4: Preparation of Compound B-5

Compound B-4 (1.6 g, 3.52 mmol, 1 eq) and Pd/C (320 mg, 10% purity) were dissolved in EtOH (30 mL), and stirred at 25° C. under $H_2$ (15 psi) for 2 hours. It was filtered, and the filtrate was concentrated in vacuo. B-5 was obtained and used directly in the next reaction.

Step 5: Preparation of Compound B-6

Compound B-5 was dissolved in dichloromethane (5 mL) solution, and TFA (8.47 g, 74.28 mmol, 5.50 mL, 21.63 eq) was added at a time under nitrogen protection at 0° C. The mixture was stirred at 25° C. for 1 hour. The reaction mixture was concentrated in vacuo to obtain the trifluoroacetate of compound B-6. LCMS (ESI) m/z: 242.9 (M+23).

Synthesis Route 3 of Intermediate

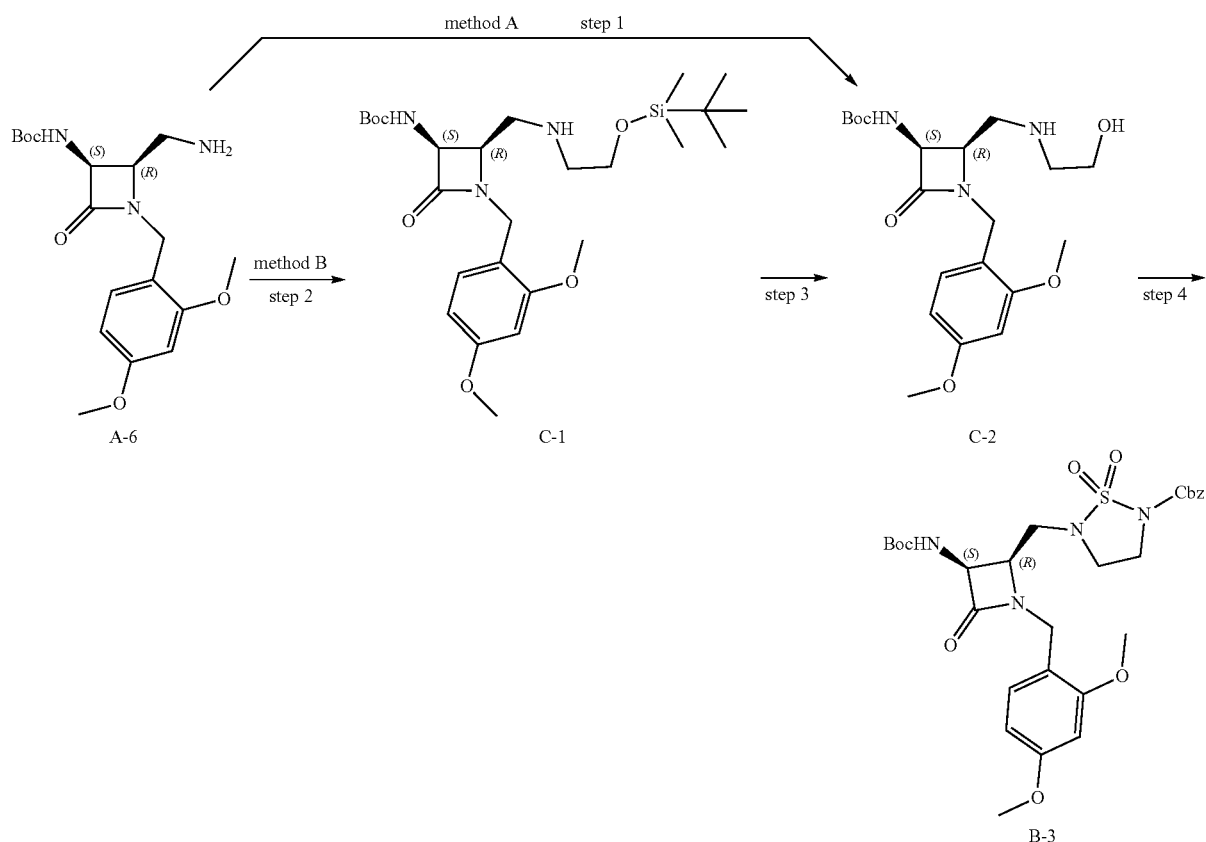

Step 1: Preparation of Compound C-2

Compound A-6 (500 mg, 1.37 mmol, 1 eq) was dissolved in acetonitrile (20 mL), and 2-bromoethanol (341.97 mg, 2.74 mmol, 194.30 μL, 2 eq) and $K_3PO_4$ (580.88 mg, 2.74 mmol, 2 eq) were added at a time under nitrogen protection at 25-30° C. The mixture was stirred at 90° C. for 12 hours, the mixture was filtered, the filtrate was washed with brine (30 mL), the mixture was extracted with EtOAc (80 mL), and the organic layer was dried over $Na_2SO_4$, filtered, and concentrated in vacuo. The residue was purified by column chromatography ($SiO_2$, petroleum ether/ethyl acetate=3:1 to 0:1). Compound C-2 was obtained. LCMS (ESI) m/z: 410.2 (M+1).

Step 2: Preparation of Compound C-1

Compound A-6 (410.0 mg, 1.12 mmol, 1 eq) was dissolved in 1,2-dichloroethane (20 mL) and MeOH (2 mL), 2-[tert-butyl (dimethyl) silyl] oxyacetaldehyde (293.36 mg, 1.68 mmol, 320.62 μL, 1.5 eq) was added under nitrogen protection at 30° C., the mixture was adjusted to pH=5 with AcOH (67.38 mg, 1.12 mmol, 64.17 μL, 1 eq) and stirred for 30 minutes, then cooled to 0-10° C., $NaBH(OAc)_3$ (832.28 mg, 3.93 mmol, 3.5 eq) was added, and the mixture was stirred for another 18 h. A saturated aqueous solution of $NaHCO_3$ (5 mL) was added to the solution, and it was extracted with DCM (10 mL). The combined organic phase was dried over anhydrous sodium sulfate, filtered, and the filtrate was concentrated in vacuo. The concentrate was purified by silica gel chromatography (petroleum ether/ethyl acetate=10:1 to 0:1) to obtain compound C-1. LCMS (ESI) m/z: 524.5 (M+1).

Step 3: Preparation of Compound C-2

A solution of tetrabutylammonium fluoride in tetrahydrofuran (1 M, 2.83 mmol, 2 eq) was added to a solution of compound C-1 (740 mg, 1.41 mmol, 1 eq) in THF (10 mL) under nitrogen protection at 0° C., and then stirred for 1 hour. 20 mL saturated brine was added to the mixture, the organic phase was separated, it was extracted with EA (20 mL, 3), and the collected organic phase was dried over anhydrous sodium sulfate, filtered, and concentrated in vacuo. The concentrate was purified by silica gel chromatography (petroleum ether/ethyl acetate=5:1 to 0:1) to obtain compound C-2. LCMS(ESI) m/z: 410.3 (M+1).

Step 4: Preparation of Compound B-3

N-(triethylaminosulfonyl) carbamate acid benzyl ester (synthetized in reference to Chem. Eur. J. 2004, 10, 5581-5606) (2575.3 mg, 2.78 mmol, 3 eq) was added to a solution of compound C-2 (380 mg, 928.02 μmol, 1 eq) in THF (10 mL) under nitrogen at 25° C., and then stirred at 75° C. for 4 hours. 10 mL of water was added to the mixture, it was extracted with EA (20 mL), and the organic phase was washed with 20 mL of brine, dried over anhydrous sodium sulfate, filtered, and concentrated in vacuo. The concentrate was purified by silica gel chromatography (petroleum ether/ethyl acetate=5:1 to 0:1) to obtain compound B-3. $^1$H NMR (400 MHz, $CDCl_3$) δ=7.35-7.28 (m, 3H), 7.27-7.20 (m, 2H), 7.17 (s, 5H), 6.38-6.33 (m, 1H), 5.23 (s, 1H), 5.14-5.00 (m, 2H), 3.71 (d, J=4.3 Hz, 5H), 3.38-3.29 (m, 2H), 3.18-2.99 (m, 2H), 1.48 (s, 20H), 1.37-1.29 (m, 9H), 1.28-1.05 (m, 4H), 0.96-0.69 (m, 2H); LCMS(ESI) m/z: 605.4 (M+1).

Synthesis Route 4 of Intermediate

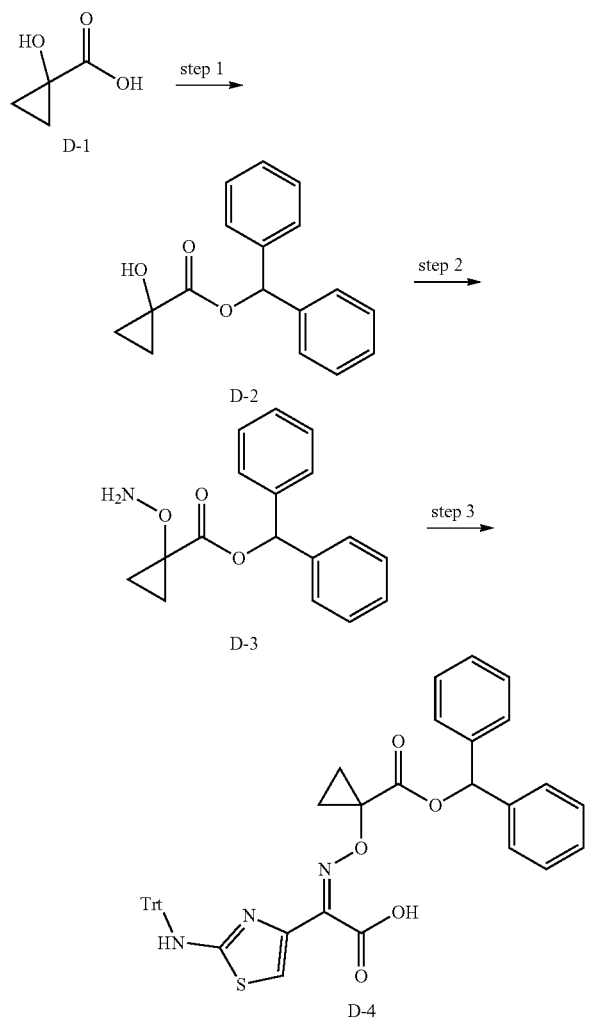

Step 1: Preparation of Compound D-2

MgSO$_4$ (4.60 g, 38.22 mmol, 0.75 eq) and manganese dioxide (15.50 g, 178.35 mmol, 3.5 eq) were added to the mixture of benzophenone hydrazone (10 g, 50.96 mmol, 1 eq) and dichloromethane (100 mL) at a time under nitrogen protection at 0-10° C. The reaction mixture was stirred at 0-30° C. for 1 hour. The mixture was filtered and the filtrate was added to a mixture of D-1 (4.94 g, 48.42 mmol, 0.95 eq) in MeOH (30 mL) under nitrogen protection at 0-10° C. The mixture was stirred at 0-30° C. for 2 hours. The mixture was concentrated in vacuo. The compound D-2 was obtained by recrystallization from PE (150 mL). $^1$H NMR (400 MHz, CDCl$_3$) δ 7.20-7.30 (m, 10H), 6.85 (s, 1H), 1.27-1.36 (m, 2H), 1.09-1.22 (m, 2H).

Step 2: Preparation of Compound D-3 t-BuONa (214.91 mg, 2.24 mmol, 1.2 eq) was added to a mixture of O-diphenylphosphorylhydroxylamine (521.50 mg, 2.24 mmol, 1.2 eq) and compound D-2 (0.5 g, 1.86 mmol, 1 eq) in THF (10 mL) under nitrogen protection at 0-10° C. The reaction mixture was stirred at 0-10° C. for 120 minutes. The reaction solution was washed with 5% brine (30 mL) and stirred for 15 minutes. The insoluble material was filtered, the filter cake was washed with ethyl acetate (10 mL), and the filtrate was extracted with ethyl acetate (20 mL). The combined organic phase was washed with saturated brine (20 mL in combination) and dried over anhydrous sodium sulfate. The EtOAc/THF (60 mL) solution of compound D-3 was obtained, which was directly use in the next reaction.

Step 3: Preparation of Compound D-4

2-oxo-2-[2-(triphenylamino) thiazol-4-yl] acetic acid (617.94 mg, 1.49 mmol, 0.8 eq) was added to the EtOAc/THF solution of compound D-3 (theoretical yield 528 mg, 1.86 mmol, 1 eq, 60 mL) at a time under nitrogen protection at 15-25° C. The mixture was stirred and reacted at 15-25° C. for 8 hours. The reaction mixture was concentrated under reduced pressure at 45° C. to obtain compound D-4. LCMS (ESI) m/z: 680.2 (M+1).

Embodiment 1

Synthesis of Compound 1

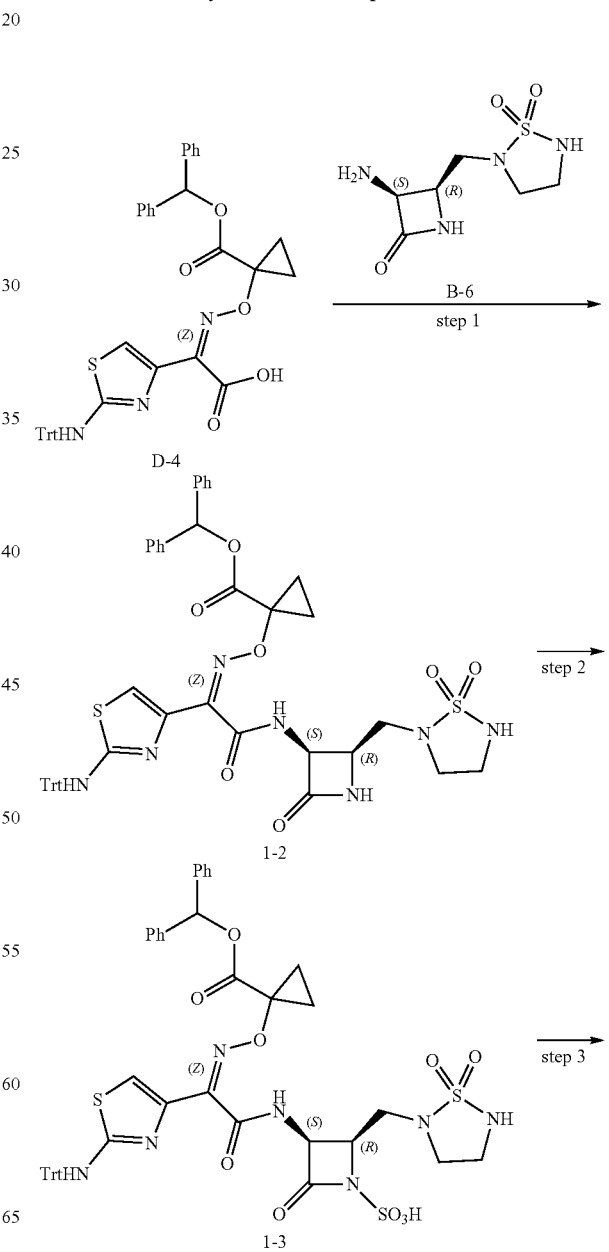

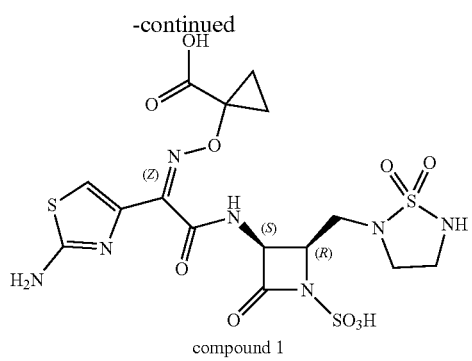

compound 1

Step 1: Preparation of Compound 1-2

HATU (1.63 g, 4.28 mmol, 1.3 eq) and TEA (998.97 mg, 9.87 mmol, 1.37 mL, 3 eq) were added to the mixed solution of the trifluoroacetate of compound B-6 (1.1 g, 3.29 mmol, 1 eq) and compound D-4 (2.01 g, 2.96 mmol, 0.9 eq) in DMF (20 mL) at 15° C., and then the reaction mixture was stirred under nitrogen at 15° C. for 8 hours. Water (50 mL) was added to the reaction solution, and the aqueous phase was extracted with ethyl acetate (100 mL acetic acid). The combined organic phase was washed with aqueous NaHCO$_3$ solution and brine, dried over anhydrous sodium sulfate, filtered and concentrated in vacuo. The crude product was purified by silica gel chromatography (PE/EA=4:1 to 1:3) to obtain compound 1-2. LCMS (ESI) m/z: 882.2 (M+1).

Step 2: Preparation of Compound 1-3

DMF·SO$_3$ complex (1.35 g, 8.84 mmol, 6 eq) was added to a mixed solution of compound 1-2 (1.3 g, 1.47 mmol, 1 eq) and DMF (15 mL) at a time under nitrogen protection at 0° C. The solution was stirred at 15° C. for 1 hour. Water (20 mL) was added to the solution and it was extracted with ethyl acetate (50 mL). The combined organic phase was washed with water and brine, dried over anhydrous sodium sulfate, filtered, and concentrated in vacuo to obtain compound 1-3. LCMS (ESI) m/z: 962.7 (M+1).

Step 3: Preparation of Compound 1

Compound 1-3 (400.00 mg, 415.77 μmol, 1 eq) was dissolved in dichloromethane (4 mL), and anisole (89.92 mg, 831.53 μmol, 90.37 μL, 2 eq) and TFA (3.08 g, 27.01 mmol, 2.00 mL, 64.97 eq) were added to the reaction mixture under nitrogen protection at 0° C. The reaction mixture was stirred at 25° C. for 1 hour. Methyl tert-butyl ether (100 mL) was added to the compound to precipitate the solid, it was filtered, and the filter cake was collected. The filter cake was purified by reverse phase HPLC (column: Phenomenex Luna C18 200*40 mm*10 um; mobile phase: [mobile phase A: water (0.1% TFA); mobile phase B: acetonitrile]; the percentage of mobile phase B: 1%-27%, 10 min) to purified the crude product to obtain compound 1. $^1$H NMR (400 MHz, DMSO-d$_6$+D$_2$O) δ=6.96 (s, 1H), 5.39-5.10 (m, 1H), 4.28-4.05 (m, 2H), 3.56-3.42 (m, 1H), 3.36-3.29 (m, 2H), 3.27-3.03 (m, 3H), 1.40 (br d, J=3.9 Hz, 4H); LCMS(ESI) m/z: 553.9 (M+1); 473.9 (M-80+1).

Embodiment 2

Synthesis of Compound 2

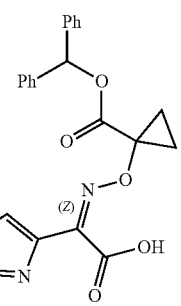

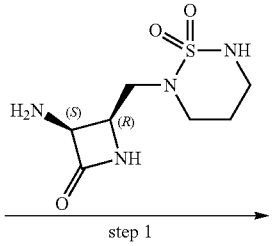

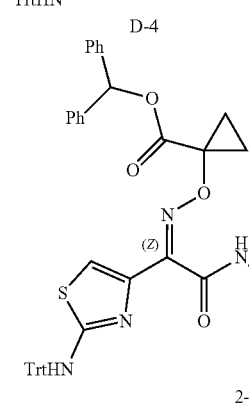

2-2

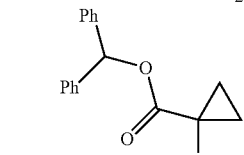

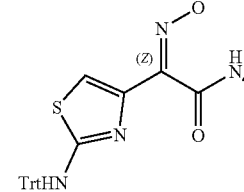

2-3

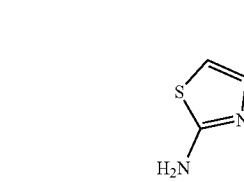

compound 2

Referring to the preparation process of compound 1, compound 2 was obtained by post processing of reversed-phase HPLC (column: Phenomenex Synergi C18 150 mm*25 mm*10 um; mobile phase: [mobile phase A: water (0.1% TFA; mobile phase B: acetonitrile]; the percentage of mobile phase B %: 1%-25%, 10 min). ¹H NMR (400 MHz, DMSO-d₆+D₂O) δ=6.90-6.84 (m, 1H), 5.21 (d, J=5.7 Hz, 1H), 4.22-4.12 (m, 1H), 3.59 (br dd, J=3.2, 14.1 Hz, 2H), 3.31-3.05 (m, 6H), 1.37 (br s, 4H); LCMS(ESI) m/z: 567.5 (M+1).
Embodiment 3
Synthesis of Compound 3
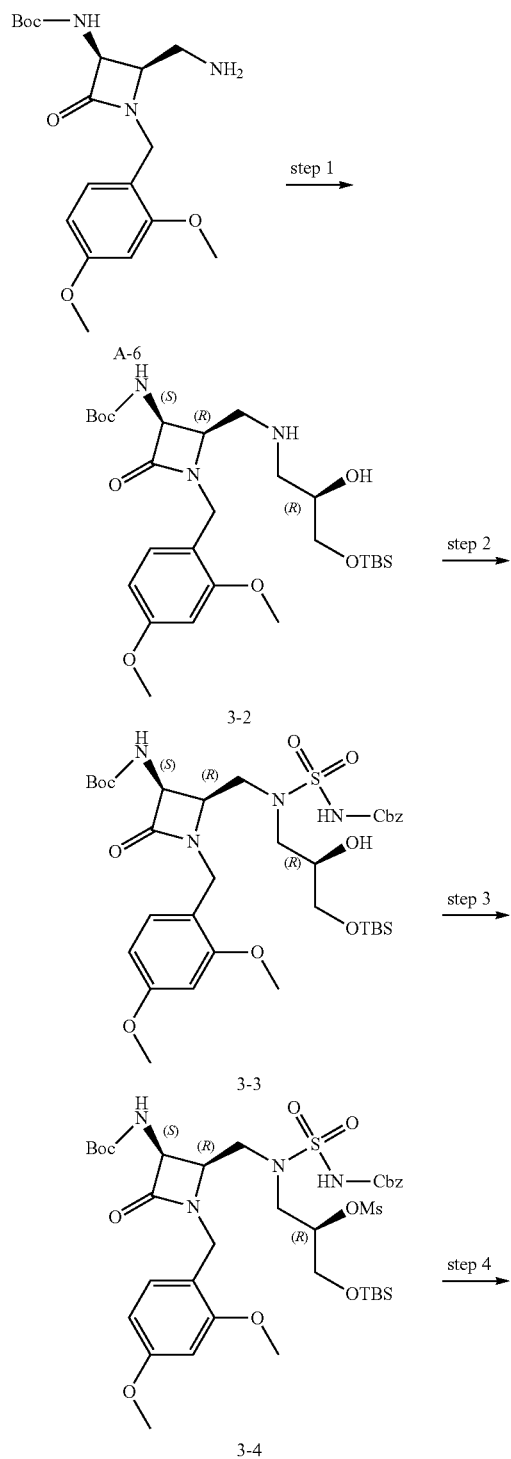
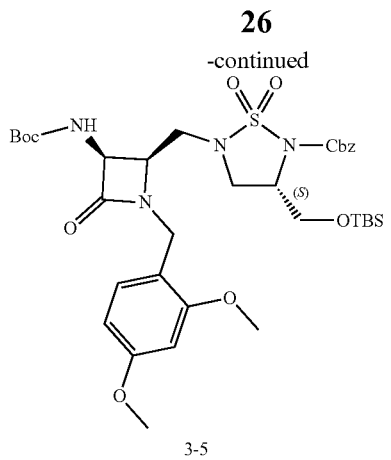

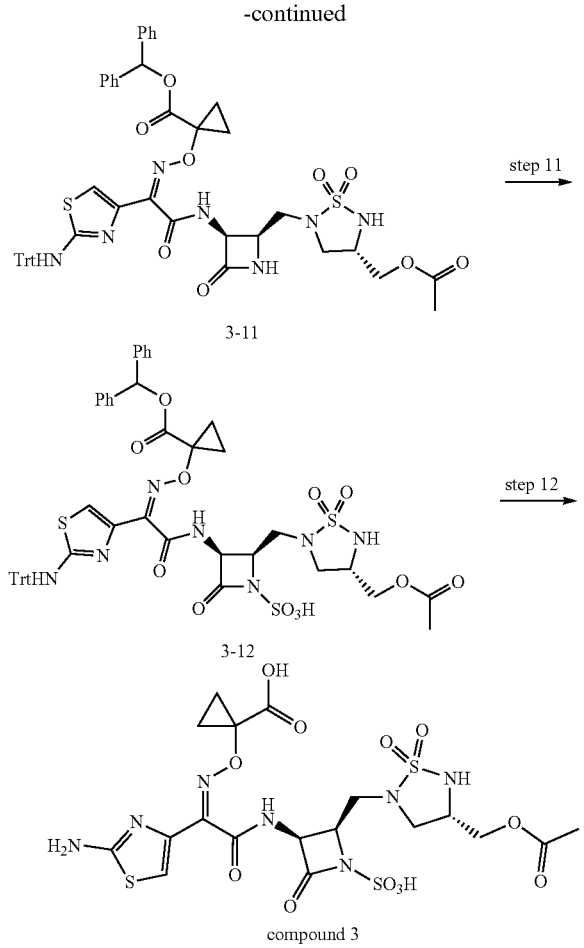

Step 1: Preparation of Compound 3-2

Compound A-6 (5.7 g, 15.60 mmol, 1 eq), tert-butyl-dimethyl-[[((2R)-oxirane-2-yl] methoxy] silane (3.23 g, 17.16 mmol, 1.1 eq) and diisopropylethylamine (2.32 g, 17.94 mmol, 3.12 mL, 1.15 eq) were dissolved in ethanol (60 mL) under nitrogen protection at 15° C., and then the mixture was stirred at 90° C. for 18 hours. The solution was concentrated in vacuo. The residue was purified by silica gel chromatography (petroleum ether/ethyl acetate=4/1 to 0/1). Compound 3-2 was obtained.

Step 2: Preparation of Compound 3-3

Compound 3-2 (4.02 g, 7.26 mmol, 1 eq) and triethylamine (1.47 g, 14.52 mmol, 2.02 mL, 2 eq) was dissolved in dichloromethane (40 mL), the temperature was lowered to 0° C., a solution of (chlorosulfonyl)carbamic acid benzyl ester (1.81 g, 7.26 mmol, 1 eq) in dichloromethane (20 mL) was added dropwise under nitrogen protection, and the mixture was stirred at 0-15° C. for 2 hours. The solution was quenched with water (50 mL) and extracted with dichloromethane (50 mL*3). The combined organic phase was washed with brine (100 mL*2), dried over anhydrous sodium sulfate, filtered, and concentrated in vacuo to obtain crude product 3-3.

Step 3: Preparation of Compound 3-4

Compound 3-3 (6.30 g, 8.21 mmol, 1 eq) and triethylamine (1.25 g, 12.32 mmol, 1.71 mL, 1.5 eq) were dissolved in dichloromethane (70 mL), the temperature was lowered to 0° C., methanesulfonyl chloride (1.13 g, 9.86 mmol, 762.92 μL, 1.2 eq) was added dropwise under nitrogen protection, and the solution was stirred at 0° C. for 2 hours. The solution was quenched with water (100 mL) and extracted with dichloromethane (100 mL*3). The combined organic phase was washed with brine (100 mL*2), dried over anhydrous sodium sulfate, filtered, and concentrated in vacuo to obtain crude product 3-4.

Step 4: Preparation of Compound 3-5

Compound 3-4 (13.40 g, 15.86 mmol, 1 eq) and potassium phosphate (4.38 g, 20.61 mmol, 1.3 eq) was mixed in acetonitrile (150 mL) at 15° C., and then the reaction solution was stirred at 80° C. for 2 hours. The filtrate was concentrated in vacuo. The residue was purified by silica gel chromatography (petroleum ether/ethyl acetate=5/1 to 3/1) to obtain compound 3-5.

Step 5: Preparation of Compound 3-6

Compound 3-5 (5.00 g, 6.68 mmol, 1 eq), potassium dihydrogen phosphate (4.65 g, 26.70 mmol, 4 eq) and potassium persulfate (8.12 g, 30.04 mmol, 6.02 mL, 4.5 eq) were mixed and dissolved in acetonitrile (240 mL) and water (120 mL) under nitrogen protection at 25° C., and then the solution was heated to 100° C. and stirred for 40 minutes. The solution was cooled, filtered, the filtrate was concentrated in vacuo, then water (50 mL) was added, it was extracted with ethyl acetate (50 mL*3), and the combined organic phase was washed with brine (100 mL*2), dried over anhydrous sodium sulfate, filtered, and concentrated in vacuo. The residue was purified by silica gel chromatography (petroleum ether/ethyl acetate=4/1 to 2/1). Compound 3-6 was obtained.

Step 6: Preparation of Compound 3-7

Compound 3-6 (2.30 g, 3.84 mmol, 1 eq) was dissolved in dichloromethane (30 mL), triethylamine trihydrofluoride (3.72 g, 23.05 mmol, 3.76 mL, 6 eq) was added to the reaction liquid under nitrogen protection at 25° C., and then the solution was stirred at 25° C. for 15 hours. Water (30 mL) was added to the solution for dilution, it was extracted with dichloromethane (30 mL*3), and the combined organic phase was washed with brine (100 mL*2), dried over anhydrous sodium sulfate, filtered and concentrated in vacuo. The residue was purified by silica gel chromatography (petroleum ether/ethyl acetate=3/1 to 0/1). Compound 3-7 was obtained.

Step 7: Preparation of Compound 3-8

Compound 3-7 (700 mg, 1.44 mmol, 1 eq) and triethylamine (190.05 mg, 1.88 mmol, 261.42 μL, 1.3 eq) were dissolved in dichloromethane (20 mL) under nitrogen protection at 0° C., acetyl chloride (136.09 mg, 1.73 mmol, 123.72 μL, 1.2 eq) was added dropwise, and the solution was slowly heated to 25° C. and stirred for 4 hours. The solution was quenched by adding water (10 mL) and extracted with methylene chloride (20 mL*3). The combined organic phase was washed with brine (50 mL*2), dried over anhydrous sodium sulfate, filtered, and concentrated in vacuo. The residue was purified by silica gel chromatography (petroleum ether/ethyl acetate=3/1 to 0/1). Compound 3-8 was obtained. $^1$H NMR (400 MHz, CDCl$_3$) δ=7.46-7.34 (m, 5H), 6.53-6.46 (m, 1H), 5.40-5.31 (m, 2H), 5.06-5.05 (m, 1H), 5.10-5.00 (m, 1H), 4.57-4.47 (m, 1H), 4.41-4.34 (m, 1H), 4.28-4.21 (m, 1H), 4.12-4.06 (m, 1H), 4.18-4.06 (m, 3H), 3.64-3.55 (m, 1H), 3.52-3.43 (m, 1H), 3.39-3.33 (m, 1H), 3.26-3.18 (m, 1H), 2.12-2.09 (m, 3H), 1.50-1.42 (m, 9H).

Step 8: Preparation of Compound 3-9

Palladium carbon (130 mg, 189.56 μmol, purity 10%) was added to the solution of compound 3-8 (430 mg, 816.62 μmol, 1 eq) in ethanol (10 mL) under nitrogen protection at 20° C., replaced with hydrogen, and then the solution was stirred under hydrogen pressure (15 Psi) at 20° C. for 2 hours. The solution was filtered, washed with tetrahydrofuran, and the filtrate was concentrated in vacuo. Compound 3-9 is obtained without purification.

Step 9: Preparation of Compound 3-10

Compound 3-9 (280 mg, 713.51 μmol, 1 eq) was dissolved in dichloromethane (1 mL) under nitrogen protection at 0° C., and TFA (1.54 g, 13.51 mmol, 1 mL, 18.93 eq) was added to the solution. The reaction solution was heated to 25° C. and reacted for 2 hours. The reaction solution was concentrated in vacuo. The crude product of the trifluoroacetate of 3-10 was obtained.

Step 10: Preparation of Compound 3-11

The trifluoroacetate of compound 3-10 (290 mg, 713.70 μmol, 1 eq) was dissolved in DMF (10 mL) under nitrogen protection at 25° C., and compound D-4 (485.16 mg, 713.70 μmol, 1 eq), HATU (352.78 mg, 927.81 μmol, 1.3 eq) and triethylamine (216.66 mg, 2.14 mmol, 298.02 μL, 3 eq) were added to the reaction solution. The solution was stirred for 4 hours. Then 10 mL of water was added to the solution, and the aqueous phase was extracted with ethyl acetate (20 mL×3). The combined organic phase was dried over anhydrous sodium sulfate, filtered, and concentrated in vacuo. The crude product was purified by silica gel chromatography (PE/EA=3/1 to 1/3) to obtain compound 3-11. LCMS: 954.3 (M+1).

Step 11: Preparation of Compound 3-12

Compound 3-11 (100 mg, 104.81 μmol, 1 eq) was dissolved in DMF (3 mL) under nitrogen protection at 0° C., and N, N-dimethylformamide sulfur trioxide complex (96.32 mg, 628.88 μmol, 6 eq) was added to the reaction solution. The reaction was carried out at 25° C. for 2 hours. Water (5 mL) was added to the reaction solution, it was extracted with ethyl acetate (10 mL*3), and the combined organic phase was washed with brine (20 mL*2), dried over anhydrous sodium sulfate, filtered, and concentrated in vacuo to obtain crude 3-12. LCMS: 1034.3 (M+1).

Step 12: Preparation of Compound 3

Compound 3-12 (60 mg, 58.02 μmol, 1 eq) was dissolved in dichloromethane (0.8 mL) under nitrogen protection at 0° C., anisole (62.74 mg, 580.19 μmol, 63.06 μL, 10 eq) and TFA (1.23 g, 10.80 mmol, 0.8 mL, 186.23 eq) were added, and then the reaction solution was stirred under nitrogen protection at 25° C. for 1 hour. The solution was washed with n-heptane (5 mL*2), the supernatant was decanted, then it was pulped with cooled MTBE (20 mL), filtered, the filter cake was washed with MTBE (5 mL), and the filter cake was purified by reverse phase HPLC (column: Phenomenex Luna C18 150*25 mm*10 μm; mobile phase: [mobile phase A: water (0.1% TFA); mobile phase B: acetonitrile]; the percentage of mobile phase B: 10%-30%, 10 min) to obtain compound 3. $^1$H NMR (400 MHz, DMSO-d6) δ=6.81 (s, 1H), 5.25 (d, J=5.5 Hz, 1H), 4.18-4.10 (m, 1H), 3.96-3.88 (m, 2H), 3.76-3.66 (m, 1H), 3.63-3.46 (m, 2H), 3.05 (br dd, J=8.3, 13.6 Hz, 1H), 2.95-2.69 (m, 2H), 2.01-1.96 (m, 3H), 1.42-1.28 (m, 4H); LCMS(ESI) m/z: 626 (M+1); 546 (M-80+1).

Embodiment 4

Synthesis of Compound 4

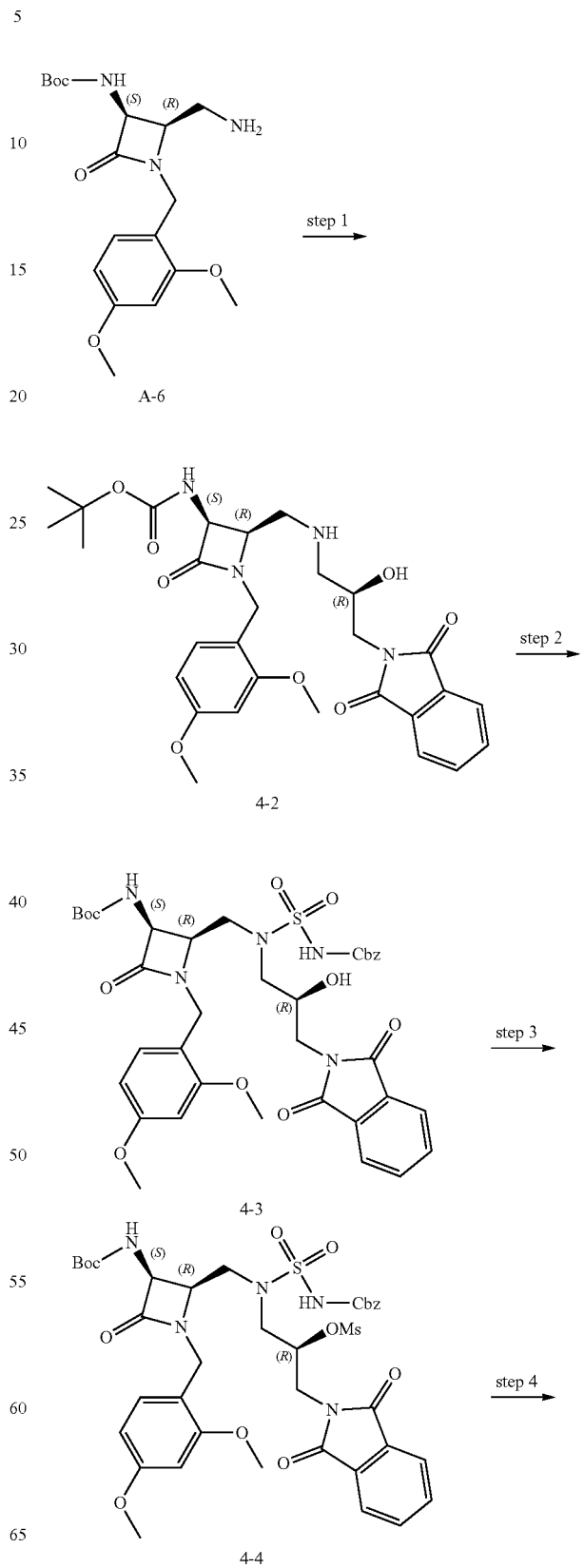

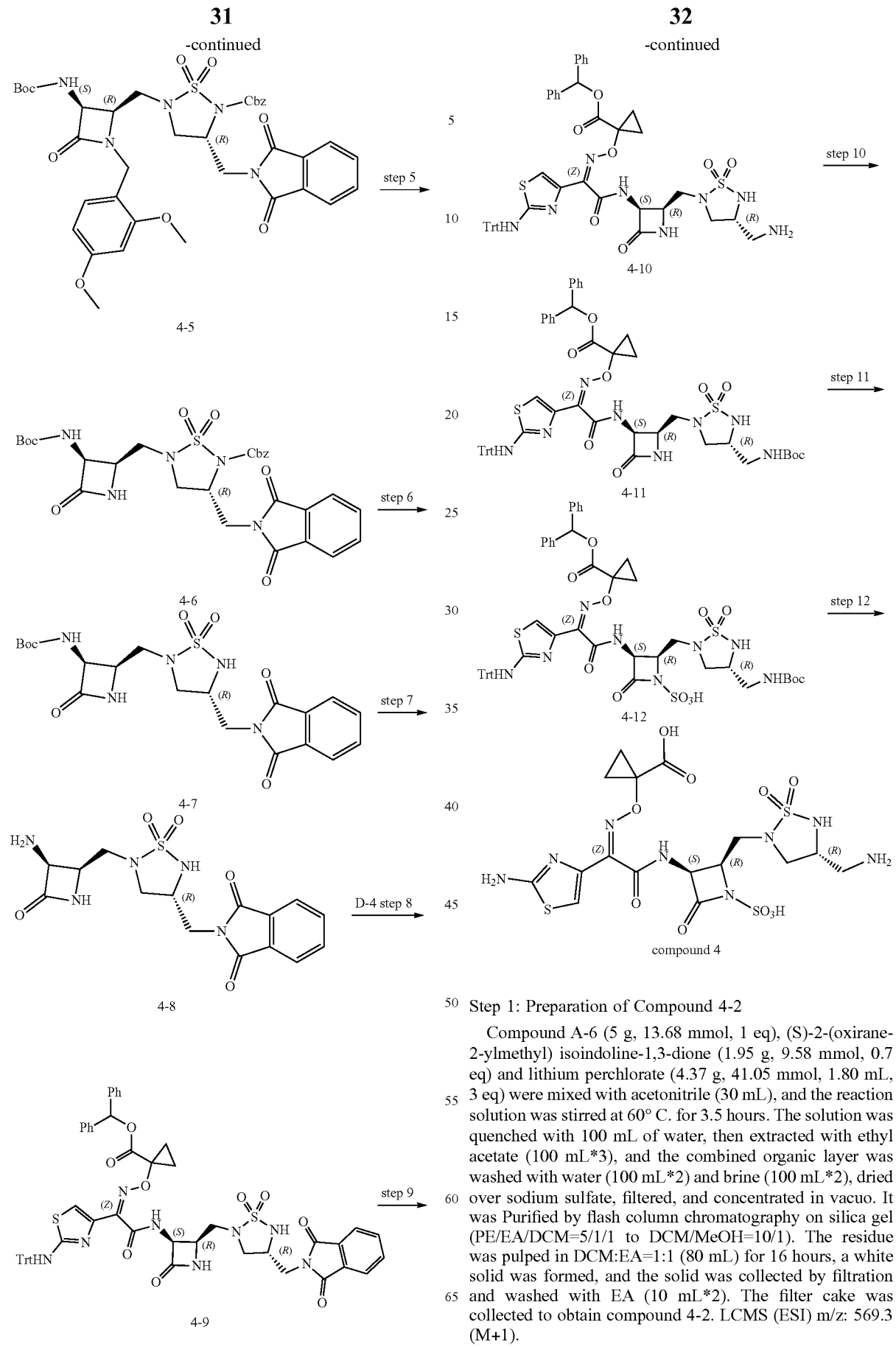

Step 1: Preparation of Compound 4-2

Compound A-6 (5 g, 13.68 mmol, 1 eq), (S)-2-(oxirane-2-ylmethyl) isoindoline-1,3-dione (1.95 g, 9.58 mmol, 0.7 eq) and lithium perchlorate (4.37 g, 41.05 mmol, 1.80 mL, 3 eq) were mixed with acetonitrile (30 mL), and the reaction solution was stirred at 60° C. for 3.5 hours. The solution was quenched with 100 mL of water, then extracted with ethyl acetate (100 mL*3), and the combined organic layer was washed with water (100 mL*2) and brine (100 mL*2), dried over sodium sulfate, filtered, and concentrated in vacuo. It was Purified by flash column chromatography on silica gel (PE/EA/DCM=5/1/1 to DCM/MeOH=10/1). The residue was pulped in DCM:EA=1:1 (80 mL) for 16 hours, a white solid was formed, and the solid was collected by filtration and washed with EA (10 mL*2). The filter cake was collected to obtain compound 4-2. LCMS (ESI) m/z: 569.3 (M+1).

Step 2: Preparation of Compound 4-3

A solution of (chlorosulfonyl)carbamic acid benzyl ester (1.84 g, 7.39 mmol, 1.5 eq) in DCM (5 mL) was added dropwise to a solution of compound 4-2 (2.8 g, 4.92 mmol, 1 eq) and triethylamine (996.56 mg, 9.85 mmol, 1.37 mL, 2 eq) in DCM (20 mL) under nitrogen protection at 0° C., and stirred for 1 hour. The reaction was quenched with 50 mL of water, then extracted with DCM (50 mL*2), and the organic layer was washed with water (100 mL*2) and brine (100 mL), dried over sodium sulfate, filtered, and concentrated in vacuo to obtain crude product 4-3. LCMS (ESI) m/z: 726.2 (M-55).

Step 3: Preparation of Compound 4-4

Methanesulfonyl chloride (700.35 mg, 6.11 mmol, 473.21 µL, 1 eq) was added dropwise to a solution of compound 4-3 (4.78 g, 6.11 mmol, 1 eq) and triethylamine (804.26 mg, 7.95 mmol, 1.11 mL, 1.3 eq) in DCM (40 mL) under nitrogen protection at 0° C., and the reaction solution was stirred for 1 hour after adding. The reaction was quenched with water (50 mL), then it was extracted with DCM (50 mL*2), and the organic layer was washed with water (100 mL*2) and brine (100 mL*2), dried over anhydrous sodium sulfate, filtered, and concentrated in vacuo to obtain compound 4-4. LCMS (ESI) m/z: 804.2 (M-55).

Step 4: Preparation of Compound 4-5

Compound 4-4 (5.32 g, 6.19 mmol, 1 eq) and potassium phosphate (1.71 g, 8.04 mmol, 1.3 eq) were mixed with acetonitrile (80 mL), and the mixture was stirred under nitrogen protection at 60° C. for 16 hours. The mixture was filtered and the filtrate was concentrated in vacuo to obtain compound 4-5. LCMS (ESI) m/z: 708.2 (M-55).

Step 5: Preparation of Compound 4-6

Compound 4-5 (2.94 g, 3.85 mmol, 1 eq) was dissolved in acetonitrile (100 mL) and water (30 mL) under nitrogen protection at 0° C., a solution of cerium ammonium nitrate (4.22 g, 7.70 mmol, 3.84 mL, 2 eq) in water (20 mL) was added dropwise to the reaction solution, and then stirred at 0-25° C. for 5 hours. 100 mL of water was added to the reaction solution, then it was extracted with EA (100 mL*2), and the organic layer was washed with water (100 mL*2) and brine (100 mL*2), dried over anhydrous sodium sulfate, filtered, and concentrated in vacuo. Compound 4-6 was obtained by purification with silica gel column chromatography (PE/EA=5/1 to 1/1, 20% DCM). LCMS (ESI) m/z: 558.2 (M-55).

Step 6: Preparation of Compound 4-7

Compound 4-6 (1.42 g, 2.31 mmol, 1 eq) and Pd/C (150 mg, 10% purity) were mixed with ethanol (40 mL), stirred under hydrogen (15 psi) at 20-30° C. for 15 hours. The mixture was filtered and the filtrate was concentrated in vacuo to obtain compound 4-7.

Step 7: Preparation of Compound 4-8

Trifluoroacetic acid (12.32 g, 108.05 mmol, 8 mL, 43.17 eq) was added to a solution of compound 4-7 (1.2 g, 2.50 mmol, 1 eq) in DCM (16 mL) under nitrogen protection at 0° C., and stirred at 0° C. for 1 hour. The solution was concentrated in vacuo to obtain a crude product of the trifluoroacetate of 4-8.

Step 8: Preparation of Compound 4-9

HATU (1.30 g, 3.42 mmol, 1.3 eq) and diisopropylethylamine (1.02 g, 7.89 mmol, 1.37 mL, 3 eq) were added to a mixed solution of the trifluoroacetate of compound 4-8 (1.3 g, 2.63 mmol, 1 eq) and compound D-4 (1.79 g, 2.63 mmol, 1 eq) in DMF (15 mL), and then stirred at 20-30° C. for 1 hour. The solution was poured into 100 mL of water, extracted with DCM (100 mL*2), and the organic layer was washed with water (100 mL) and brine (100 mL), dried over anhydrous sodium sulfate, filtered, and concentrated in vacuo. Compound 4-9 was obtained by purification with silica gel column chromatography (DCM/EA=1/0 to 1/2). LCMS (ESI) m/z: 1041.4 (M+1).

Step 9: Preparation of Compound 4-10

Compound 4-9 (1.22 g, 1.04 mmol, 1 eq) and hydrazine hydrate (265.13 mg, 5.19 mmol, 257.40 µL, 98% purity, 5 eq) were mixed with ethanol (30 mL), and the mixed solution was stirred at 30° C. for 4 hours. The solution was poured into 250 mL of water, extracted with DCM (150 mL*3), and the organic layer was washed with brine (200 mL*2), dried over anhydrous sodium sulfate, filtered, and concentrated in vacuo. The concentrate was purified by flash column chromatography on silica gel (DCM/MeOH=50/1 to 20/1) to obtain 4-10. LCMS (ESI) m/z: 911.4 (M+1).

Step 10: Preparation of Compound 4-11

A solution of $Boc_2O$ (45.16 mg, 206.90 µmol, 47.53 µL, 1.3 eq) in DCM (0.5 mL) was added to a mixed solution of compound 4-10 (145 mg, 159.16 µmol, 1 eq) and triethylamine (40.26 mg, 397.89 µmol, 55.38 µL, 2.5 eq) in DCM (5 mL) under nitrogen protection at 0° C., and stirred for 1 hour. 10 mg of $Boc_2O$ was added, and it was stirred at 25-30° C. for 1 hour. The solution was diluted with DCM (10 mL), then washed with brine (10 mL*2), and the organic layer was dried over $Na_2SO_4$, filtered, and concentrated in vacuo. The residue was purified by flash column chromatography on silica gel (PE/EA=2/1 to 0/1) to obtain compound 4-11. LCMS (ESI) m/z: 1011.5 (M+1).

Step 11: Preparation of Compound 4-12

N,N-dimethylformamide sulfur trioxide complex (59.07 mg, 385.69 µmol, 3 eq) was added to a solution of compound 4-11 (130 mg, 128.56 µmol, 1 eq) in DMF (2 mL) at 25° C. The reaction solution was reacted at 25° C. for 1 hour. 10 mL of water was added to the solution, and it was extracted with ethyl acetate (20 mL×3). The combined organic phase was washed with brine (50 mL*2), dried over anhydrous sodium sulfate, filtered, and concentrated in vacuo. Compound 4-12 was obtained. LCMS (ESI) m/z: 1091.4 (M+H).

Step 12: Preparation of Compound 4

Trifluoroacetic acid (1.54 g, 13.51 mmol, 1 mL, 98.26 eq) was added to a solution of compound 4-12 (150 mg, 137.46 µmol, 1 eq) and anisole (29.73 mg, 274.92 µmol, 29.88 µL, 2 eq) in DCM (1 mL) at 0° C. The mixture was then stirred at 25° C. for 1 hour. The temperature was lowered to 0° C., n-heptane (6 mL*3) was added to the mixture, the supernatant was decanted, then it was pulped with cooled MTBE (4 mL), and then the solution was filtered under the protection of $N_2$. The crude product was purified by reverse phase HPLC (column: Waters Atlantis T3 150 mm*30 mm*5 µm; mobile phase: [mobile phase A: water (0.1% TFA); mobile phase B: acetonitrile]; the percentage of mobile phase B: 5%-35%, 10 min) to obtain the trifluoroacetate of compound 4. $^1$H NMR (400 MHz, DMSO-$d_6$+$D_2O$) δ=6.86 (s, 1H), 5.27-5.19 (m, 1H), 4.23-4.16 (m, 1H), 3.73-3.59 (m, 2H), 3.40-3.33 (m, 1H), 3.20-3.06 (m, 2H), 3.03-2.82 (m, 3H), 1.36 (br s, 4H); LCMS(ESI) m/z: 583.0 (M+1).

Embodiment 5

Synthesis of Compound 5

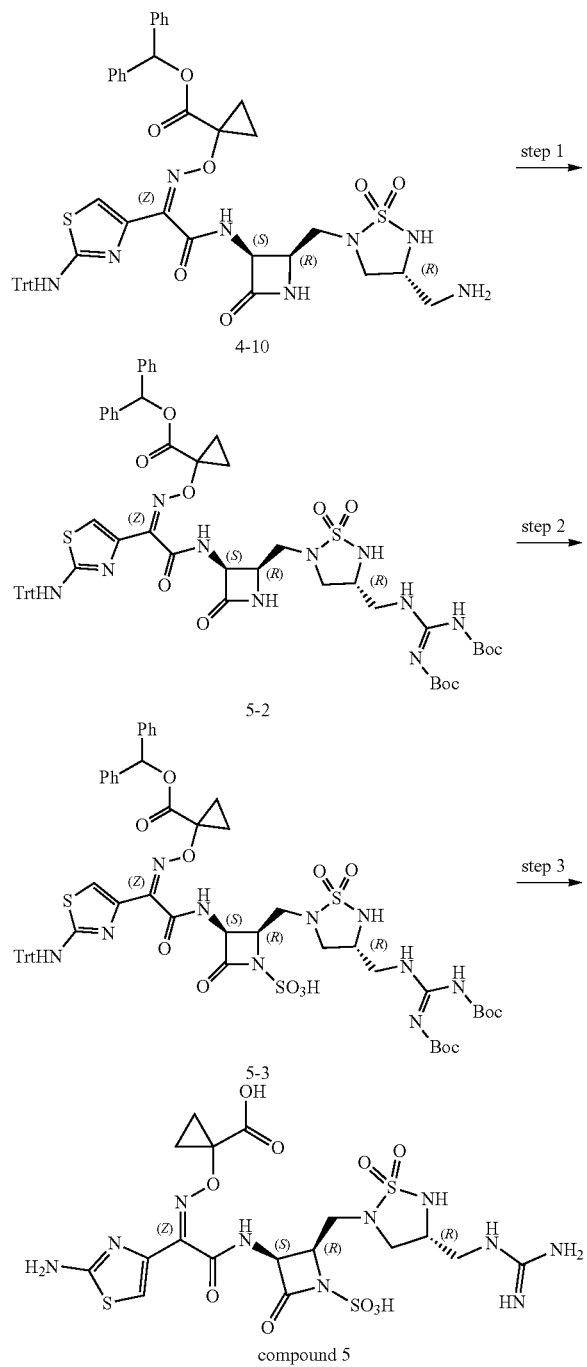

hours. The mixture was filtered, the filtrate was concentrated under reduced pressure, and the residue was purified by silica gel chromatography (petroleum ether/ethyl acetate=10/1 to DCM/MeOH=10/1) to purify the crude product to obtain compound 5-2. LCMS (ESI) m/z: 1153.5 (M+1).

Step 2: Preparation of Compound 5-3

Compound 5-2 (85 mg, 73.70 μmol, 1 eq) was dissolved in DMF (2 mL) under nitrogen protection at 25° C., N,N-dimethylformamide sulfur trioxide complex (33.86 mg, 221.10 μmol, 3 eq) was added to the solution, and then stirred at 25° C. for 1 hour. 10 mL of water was added to the reaction solution, and it was extracted with ethyl acetate (20 mL×3). The combined organic phase was washed with brine (50 mL*2), dried over anhydrous sodium sulfate, filtered, and concentrated in vacuo to obtain crude product 5-3. LCMS (ESI) m/z: 1234.7 (M+1).

Step 3: Preparation of Compound 5

Trifluoroacetic acid (1.54 g, 13.51 mmol, 1 mL, 179.12 eq) was added to a solution of compound 5-3 (93 mg, 75.40 μmol, 1 eq) and anisole (16.31 mg, 150.80 μmol, 16.39 μL, 2 eq) in DCM (1 mL) at 0° C. The mixture was then stirred at 25° C. for 1 hour. The temperature was lowered to 0° C., n-heptane (6 mL*3) was added to the mixture, the supernatant was decanted, and it was pulped with cooled MTBE (4 mL) at 0° C., and then filtered under nitrogen protection. The crude product was purified by reverse phase HPLC (column: Shim-pack C18 150×25 mm×10 μm; mobile phase: [mobile phase A: water (0.1% TFA); mobile phase B: acetonitrile]; the percentage of mobile phase B: 12%-30%, 10 min) to obtain compound 5. LCMS (ESI) m/z: 625.0 (M+1).

Embodiment 6

Synthesis of Compound 6

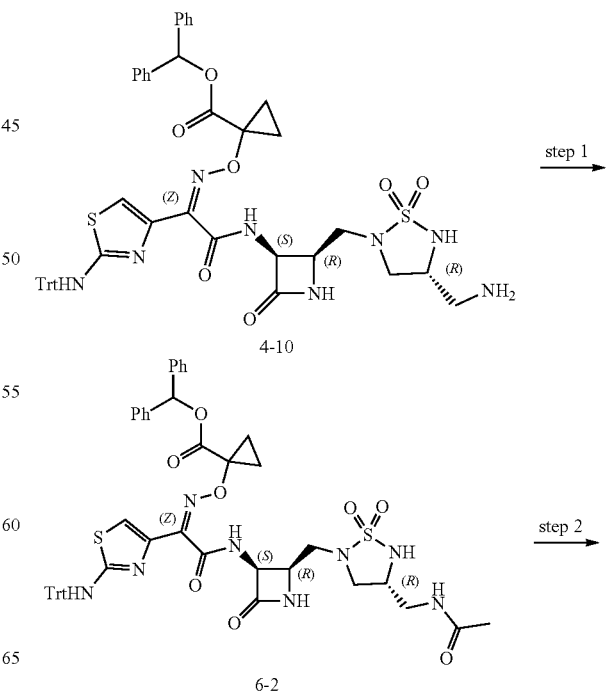

Step 1: Preparation of Compound 5-2

Compound 4-10 (87 mg, 1 eq) and (E)-tert-butyl (((tert-butoxycarbonyl)amino)(1H-pyrazol-1-yl)methylene)carbamate (35.56 mg, 114.59 μmol, 1.2 eq) were mixed with acetonitrile (5 mL) at 20-25° C., triethylamine (24.16 mg, 238.73 μmol, 33.23 μL, 2.5 eq) was added dropwise to the mixture, then magnesium sulfate (53.22 mg, 442.14 μmol, 4.63 eq) was added, and it was stirred at 20-25° C. for 20

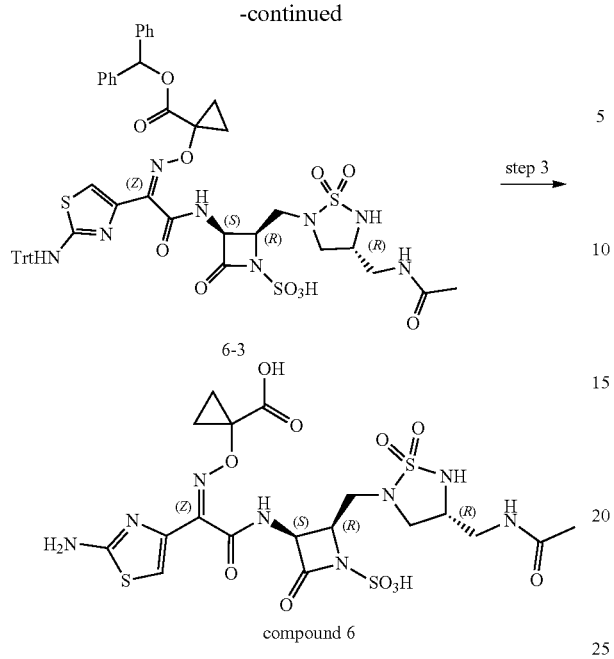

compound 6

Step 1: Preparation of Compound 6-2

A solution of acetic anhydride (17.93 mg, 175.62 μmol, 16.45 μL, 1 eq) in dichloromethane (0.5 mL) was added dropwise to a mixed solution of compound 4-10 (160 mg, 175.62 μmol, 1 eq), triethylamine (44.43 mg, 439.05 μmol, 61.11 μL, 2.5 eq) and DCM (5 mL) under nitrogen protection at 0° C., and stirred at this temperature for 1 hour. The solution was washed with brine (10 mL*2), dried over anhydrous sodium sulfate, filtered, and concentrated in vacuo. The crude product 6-2 was obtained by purification with silica gel chromatography (PE/EA=2/1-0/1 to DCM/MeOH=10/1). LCMS (ESI) m/z: 953.5 (M+1).

Step 2: Preparation of Compound 6-3

Compound 6-2 (210 mg, 220.34 μmol, 1 eq) was dissolved in DMF (5 mL) under nitrogen protection at 25° C., and N,N-dimethylformamide sulfur trioxide complex (101.24 mg, 661.01 μmol, 3 eq) was added to the solution. It was stirred at this temperature for 1 hour. Water (10 mL) was added to the solution, and it was extracted with ethyl acetate (10 mL*3). The combined organic phase was washed with brine (20 mL*2), dried over anhydrous sodium sulfate, filtered, and concentrated in vacuo to obtain compound 6-3. LCMS: 1033.6 (M+1).

Step 3: Preparation of Compound 6

Anisole (99.43 mg, 919.51 μmol, 99.93 μL, 5 eq) and trifluoroacetic acid (20.97 mg, 183.90 μmol, 13.62 μL, 1 eq) were added to a solution of compound 6-3 (190 mg, 183.90 μmol, 1 eq) in DCM (0.8 mL) under nitrogen protection of at 0° C., and then the reaction solution was stirred at 25° C. for 1 hour. The temperature was lowered to 0° C., n-heptane (5 mL*2) was added to the mixture, the supernatant was decanted, it was pulped with cooled MTBE (10 mL) at 0° C., filtered, and the filter cake was washed with MTBE. The obtained crude product was purified by reverse phase HPLC (column: Waters Atlantis T3 150×30 mm×5 μm; mobile phase: [mobile phase A: water (0.1% TFA); mobile phase B: acetonitrile]; the percentage of mobile phase B: 5%-35%, 10 min) to obtain compound 6. $^1$H NMR (400 MHz, DMSO-$d_6$+$D_2O$) δ=6.89 (s, 1H), 5.24 (d, J=5.6 Hz, 1H), 4.20-4.12 (m, 1H), 3.60 (quin, J=6.8 Hz, 1H), 3.53-3.36 (m, 2H), 3.15-2.99 (m, 3H), 2.91 (dd, J=7.0, 9.5 Hz, 1H), 1.87-1.73 (m, 3H), 1.38 (br s, 4H); LCMS: 625 (M+1); 545 (M-80+1).

Experimental Example 1: Detection of Antibacterial Activity (MIC) of the Compounds Three strains of *Klebsiella pneumonia*, ATCC BAA-205 (TEM-1/SHV-1/SHV-12), ATCC BAA-1705 (KPC-2), ATCC BAA-2470 (NDM-1), *Enterobacter cloacae* ATCC BAA-1143 (AmpC), two strains of *Escherichia coli* ATCC BAA-2523 (OXA-48), ATCC 25922 were used to determine the minimum inhibitory concentration (MIC) of each of the compounds by micro-liquid dilution method according to the Institute of Clinical and Laboratory Standard (CLSI) requirements. A 2-fold serial dilution of the compound (final concentration ranging from 0.125 μg/ml to 128 g/ml) was added to a round-bottom 96-well plate (Catalog #3788, Corning), fresh monoclonal bacteria were selected from an overnight cultured Mueller Hinton II Agar medium plate (MHA, Cat. No. 211438, BD BBL™) and suspended in sterile normal saline, the concentration was adjusted to 1×10$^8$ CFU/mL, and then the solution was diluted by using a cation-adjusted Hinton Mueller culture medium Cation-Adjusted Mueller Hinton II Broth (MHB, Catalog #212332, BD BBL™) to a concentration of 5×10$^5$ CFU/ml, and 100 μl of the solution was added to a round bottom 96-well plate containing the drugs. The plate was placed upside down at 37° C. and the MIC value was read after 20-24 h of incubation, and the lowest drug concentration that inhibited the growth of bacteria was set as MIC. The results are shown in Table 1. Colony-Forming Units (CFU) refer to the total number of bacterial colonies per unit volume.

TABLE 1

Results of Antibacterial Activity Detection (MIC) of the Embodiments of the Present Disclosure

| | Bacterial strain | | | | | |
|---|---|---|---|---|---|---|
| | *K. pneumonia* | | | *E. cloacae* | *E. coli* | *E. coli* |
| | ATCC BAA-205 | ATCC BAA-1705 | ATCC BAA-2470 | ATCC BAA-1143 | ATCC BAA-2523 | ATCC 25922 |
| | Drug resistant gene | | | | | |
| Compound | Class A (TEM-1/SHV-1/SHV-12) | Class A (KPC-2) | Class B (NDM-1) | Class C (AmpC) | Class D (OXA-48) | — |
| Compound 1 | 0.5 | 0.5 | 0.5 | 1 | 0.5 | 1 |
| Compound 2 | 1 | 2 | 1 | 2 | 1 | 4 |
| Compound 3 | 2 | 2 | 1 | 2 | 0.25 | 4 |

TABLE 1-continued

Results of Antibacterial Activity Detection (MIC) of the Embodiments of the Present Disclosure

| | Bacterial strain | | | | | |
|---|---|---|---|---|---|---|
| | K. pneumonia | | | E. cloacae | E. coli | E. coli |
| | ATCC BAA-205 | ATCC BAA-1705 | ATCC BAA-2470 | ATCC BAA-1143 | ATCC BAA-2523 | ATCC 25922 |
| | Drug resistant gene | | | | | |
| Compound | Class A (TEM-1/SHV-1/SHV-12) | Class A (KPC-2) | Class B (NDM-1) | Class C (AmpC) | Class D (OXA-48) | — |
| Compound 4 | 0.5 | 1 | 0.25 | 0.5 | 0.125 | 0.25 |
| Compound 5 | 1 | 1 | 0.5 | 1 | 0.25 | 0.5 |
| Compound 6 | 2 | 8 | 1 | 1 | 0.25 | 4 |

Conclusion: The compound of the present disclosure has a good inhibition effect on various bacteria.

Experimental Example 2: Detection of Antibacterial Activity (MIC) of the Compounds on Clinically Isolated Bacteria The minimum inhibitory concentration (MIC) of the compound and combination with β-lactamase (MBLs) inhibitors against clinically isolated carbapenem-resistant enterobacteriaceae was determined by the two-fold agar dilution method to determine the activity of the compound to be tested against strains producing MBLs. Antibiotics and enzyme inhibitors were weighed separately and dissolved in sterile ultrapure water or dimethyl sulfoxide to prepare mother liquor, MHA medium was prepared, pH was adjusted to 7.2-7.4, and it was sterilized at 121° C. for 15 minutes and placed in a 55° C. water bath for heat preservation. The mother liquor was diluted to the concentration to be tested by double dilution method, an inoculum liquid was prepared by direct bacterial suspension method, 1 mL of the prepared bacteria solution was withdrawn and putted into the inoculation tube, and a positioning needle and an inoculation needle were installed. A bacterial multi-point inoculator was started for inoculation. After the bacterial solution was absorbed by the agar, the plate was placed upside down in an incubator at 37° C. for 16-20 hours, and the results were observed. The average of three tests was taken. The test results of the single drug and combined drug of the compound are shown in Tables 2 and 3 below.

Conclusion: The antibacterial activity of the compound of the present disclosure and its combination with β-lactamase (MBLs) inhibitors is significantly better than that of LYS-228 and the marketed drugs meropenem and aztreonam.

TABLE 2

Minimum Inhibitory Concentration (μg/mL) and $MIC_{50}$, $MIC_{90}$ of the Compound of the Present Disclosure

| Strain name and number | MIC | | | |
|---|---|---|---|---|
| | Compound 4 | LYS 228 | Meropenem | Aztreonam |
| E.coli BAA-2452 | 0.125 | 0.5 | 16 | 16 |
| E.coli 020028 | 0.03 | 0.125 | 16 | 16 |
| E.coli 020031 | 0.5 | 4 | 32 | 4 |
| E.coli 020033 | 1 | 8 | 32 | 32 |
| E.coli 115101 | 0.5 | 4 | 128 | >128 |
| E.coli 115103 | 1 | 8 | 16 | 128 |
| E.coli 115105 | 1 | 4 | 128 | 16 |
| E.coli C1569 | 1 | 4 | 16 | 1 |
| E.coli CRE18 | 1 | 4 | 32 | >128 |
| E.coli CRE21 | 1 | 4 | 64 | >128 |
| E.coli CRE23 | 1 | 2 | 32 | >128 |
| E.coli CRE28 | 1 | 4 | 32 | >128 |
| Morganella morganii C1274 | 0.125 | 0.25 | 2 | 4 |
| K.p BAA-2470 | 0.125 | 0.25 | 32 | >128 |
| K.p 11544 | 0.06 | 0.125 | 16 | >128 |
| K.p 13249 | 0.06 | 0.125 | 32 | >128 |
| K.p 115004 | 0.125 | 0.25 | 16 | 64 |
| K.p C904 | 0.125 | 0.125 | 16 | >128 |
| K.p CRE11 | 0.125 | 0.125 | 32 | 128 |
| K.p CRE12 | 0.06 | 0.125 | 16 | 4 |
| K.p CRE16 | 0.06 | 0.06 | 8 | 64 |
| K.p 090339 | 0.125 | 0.25 | 16 | 64 |
| K.p HX30 | 0.5 | 2 | 128 | >128 |
| K.p HX37 | 0.25 | 0.5 | 32 | >128 |
| K.p HX77 | 0.03 | 0.03 | 16 | 16 |
| K.p 6777 | 0.125 | 1 | 8 | 128 |
| $MIC_{50}$ | 0.125 | 0.5 | 16 | 128 |
| $MIC_{90}$ | 1 | 4 | 128 | >128 |

TABLE 3

Minimum Inhibitory Concentration (μg/mL) and $MIC_{50}$, $MIC_{90}$ of the Compound of the Present Disclosure Combined with β-lactamase (MBLs) Inhibitor

| Strain name and number | MIC | | |
|---|---|---|---|
| | Compound 4/Avibatan | LYS228/ Avibatan | Aztreonam/ Avibatan |
| E.coli BAA-2452 | 0.06/2 | 0.25/2 | 0.125/2 |
| E.coli 020028 | 0.03/2 | 0.25/2 | 0.06/2 |
| E.coli 020031 | 0.5/2 | 4/2 | 2/2 |
| E.coli 020033 | 0.5/2 | 4/2 | 8/2 |
| E.coli 115101 | 0.125/2 | 0.25/2 | 0.5/2 |
| E.coli 115103 | 0.5/2 | 4/2 | 4/2 |
| E.coli 115105 | 0.5/2 | 4/2 | 2/2 |
| E.coli C1569 | 0.5/2 | 4/2 | 1/2 |
| E.coli CRE18 | 0.5/2 | 4/2 | 1/2 |
| E.coli CRE21 | 1/2 | 8/2 | 2/2 |
| E.coli CRE23 | 0.5/2 | 4/2 | 1/2 |
| E.coli CRE28 | 0.5/2 | 4/2 | 1/2 |
| Morganella morganii C1274 | 0.125/2 | 0.5/2 | 0.125/2 |
| K.p BAA-2470 | 0.125/2 | 0.5/2 | 0.125/2 |
| K.p 11544 | 0.06/2 | 0.125/2 | 0.125/2 |

TABLE 3-continued

Minimum Inhibitory Concentration (μg/mL) and $MIC_{50}$, $MIC_{90}$ of the Compound of the Present Disclosure Combined with β-lactamase (MBLs) Inhibitor

| | MIC | | |
| --- | --- | --- | --- |
| Strain name and number | Compound 4/Avibatan | LYS228/ Avibatan | Aztreonam/ Avibatan |
| K.p 13249 | 0.06/2 | 0.125/2 | 0.06/2 |
| K.p 115004 | 0.125/2 | 0.25/2 | 0.125/2 |
| K.p C904 | 0.125/2 | 0.25/2 | 0.125/2 |
| K.p CRE11 | 0.125/2 | 0.25/2 | 0.06/2 |
| K.p CRE12 | 0.06/2 | 0.125/2 | 0.06/2 |
| K.p CRE16 | 0.06/2 | 0.06/2 | 0.06/2 |
| K.p 090339 | 0.125/2 | 0.25/2 | 0.06/2 |
| K.p HX30 | 0.5/2 | 2/2 | 1/2 |
| K.p HX37 | 0.25/2 | 1/2 | 0.5/2 |
| K.p HX77 | 0.125/2 | 0.06/2 | 0.06/2 |
| K.p 6777 | 0.125/2 | 0.5/2 | 0.5/2 |
| $MIC_{50}$ | 0.125/2 | 0.5/2 | 0.125/2 |
| $MIC_{90}$ | 0.5/2 | 4/2 | 2/2 |

Experimental Example 3: Experimental Evaluation of Drug Efficacy in Mice (Mouse Thigh Muscle Model)

9 female CD-1 mice were divided into 3 cages, 3 mice per cage, and were injected intraperitoneally with immunosuppressant cyclophosphamide (150 mg/kg).

24 hours later, 3 cages of mice were injected intraperitoneally again with immunosuppressant cyclophosphamide (100 mg/kg). The strain E. coli ATCC-25922 was recovered on an MHA plate. The recovered colonies were picked and dissolved in saline to prepare E. coli ATCC-25922 bacterial solution with a concentration of 1.36E+07 CFU/mL for use in mouse thigh muscle infection. The amount of bacterial solution injected into the thigh muscle of the experimental mice was 100 μL/mouse, that is, the inoculation amount was 1.36E+06 CFU/mouse. 2 h after infection, the thigh muscle tissue of the mice in control group was taken and placed in 10 mL saline, homogenized, and dotted on a plate with gradient dilution.

The specific administration of mice was as follows:

(1) 2 h after infection: At the end point of 2 h infection, the thigh muscle tissue of the mice in the first cage was taken and placed in 10 mL saline, homogenized, and dotted on a plate with gradient dilution, two duplications for each mouse. The amount of bacteria loaded in the thigh muscle tissue of the mouse was counted. Mice in the third cage were injected respectively with 100 mg/kg of compound 1 subcutaneously.

(2) 4, 6 and 8 h after infection: Mice in the third cage were injected respectively with 100 mg/kg of compound 1 subcutaneously. At the end point of 10 h infection, the thigh muscle tissue of the mice in the second to third cages was taken and placed in 10 mL saline, homogenized, and dotted on a plate with gradient dilution, two duplications for each mouse. The amount of bacteria loaded in the thigh muscle tissue of the mouse was counted, and the experimental results were sorted and shown in Table 4.

TABLE 4

Experimental Results of the Amount of Bacteria Loaded in Mouse Thigh Muscle Tissues

| Group | Average CFU of the mouse |
| --- | --- |
| 2 h control group | 2.37E+06 |
| 10 h infection group | 4.48E+08 |
| Compound 1 (100 mg/kg) | 2.25E+05 |

Conclusion: The compound of the present disclosure has a significant inhibitory effect on infection.

Experimental Example 4: Experimental Evaluation of Drug Efficacy in Mouse Thigh Muscle Infection Model 15 female CD-1 mice were divided into 5 cages, 3 mice per cage; the day of infection was counted as day 0.

Immunosuppressant cyclophosphamide 150 mg/kg were injected intraperitoneally on Day-4, and immunosuppressant cyclophosphamide 100 mg/kg was injected intraperitoneally again on the first day to obtain immunodeficient mice.

The strain Klebsiella pneumoniae ATCC-BAA 2470 was recovered on an MHA plate on the first day. The recovered colonies were picked and dissolved in sterile saline to prepare bacterial solution with a concentration of 9.5E+07 CFU/mL for use in mouse thigh muscle infection. The infection starting time was counted as 0 h, and 100 μL of bacterial solution is injected into the thigh muscle of each mouse at 0 h, that is, the inoculation amount is 9.5E+06 CFU/mouse. 2 h after infection, the drugs were administered according to the experimental scheme. The specific experimental scheme is as follows (see Table 5):

(1) 2 h after infection: At the end point, the thigh muscle tissue of the mice in the first cage was taken and placed in 10 mL saline, the tissue was homogenized by a homogenizer, and the homogenate was dotted on a plate with gradient dilution, two duplications for each mouse.

(2) 2 h after infection: Mice in the second to third cages were administered separately at a volume of 10 mL/kg according to the mouse body weight. The mice in the second cage were administered with menstruum subcutaneously every 2 h to a 24 h end-point; the mice in the third cage were administered with compound 4 at 200 mg/kg by intraperitoneal injection every 2 h to a 24 h end-point. At the end point, the thigh muscle tissue was taken and placed in 10 mL sterile saline, the tissue was homogenized by a homogenizer, and the homogenate was dotted on a plate with gradient dilution, two duplications for each mouse. The amount of bacteria loaded in the thigh muscle tissue of the mouse was counted, and the experimental results were shown in Table 6.

TABLE 5

Experimental Scheme

| Experimental group | Number of animals | Compound | Inoculation dose | Administration mode | Experimental end point |
|---|---|---|---|---|---|
| 1 | 3 | 2 h control group | *Klebsiella Pneumoniae* ATCC-BAA 2470 1.0E+07 CFU/mouse | — | 2 h |
| 2 | 3 | 24 h infection group | | 5% DMSO + 20% PEG400 + saline administered subcutaneously | 24 h |
| 3 | 3 | Compound 4 | | 200 mg/kg, every 2 h, 2, 4, 6, 8, 10, 12, 14, 16, 18, 20, 22 h, administered subcutaneously | 24 h |

TABLE 6

Experimental Results of the Amount of Bacteria Loaded in Mouse Thigh Muscle Tissue

| Group | Average CFU of the mouse |
|---|---|
| 2 h control group | 4.53E+07 CFU/mouse |
| 24 h infection group | 2.10E+10 CFU/mouse |
| Compound 4 (200 mg/kg) | 3.93E+06 CFU/mouse |

Conclusion: The compound of the present disclosure has a significant inhibitory effect on infection.

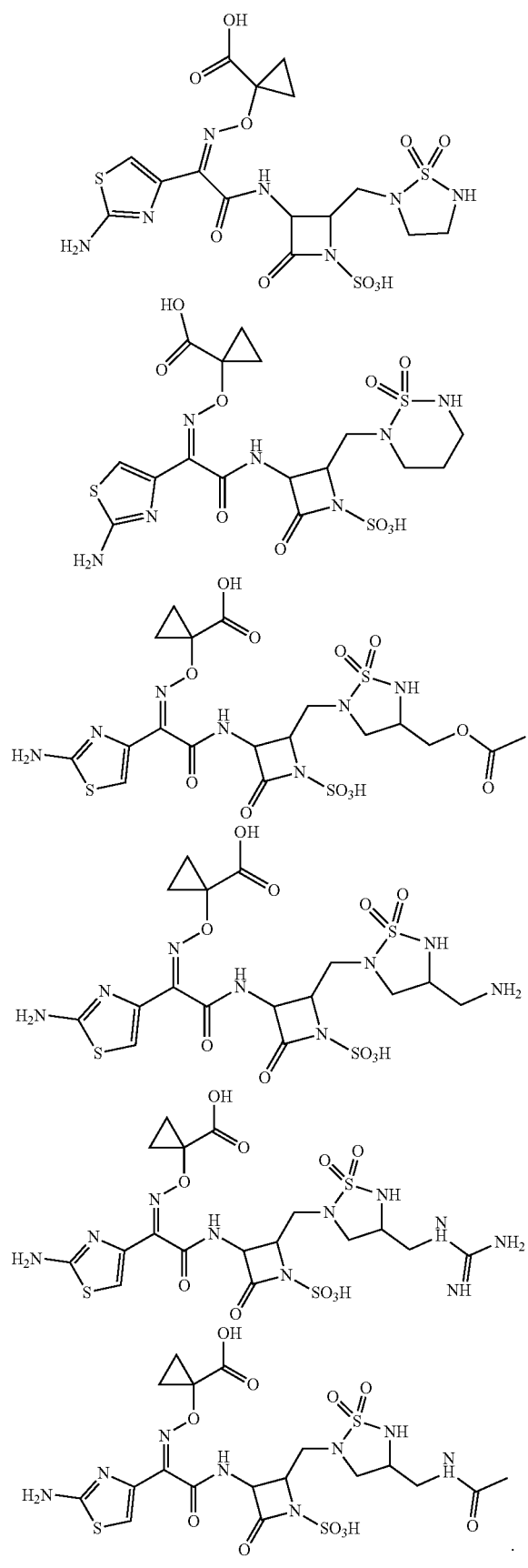
10. The compound or the pharmaceutically acceptable salt thereof according to claim 9, which is selected from:
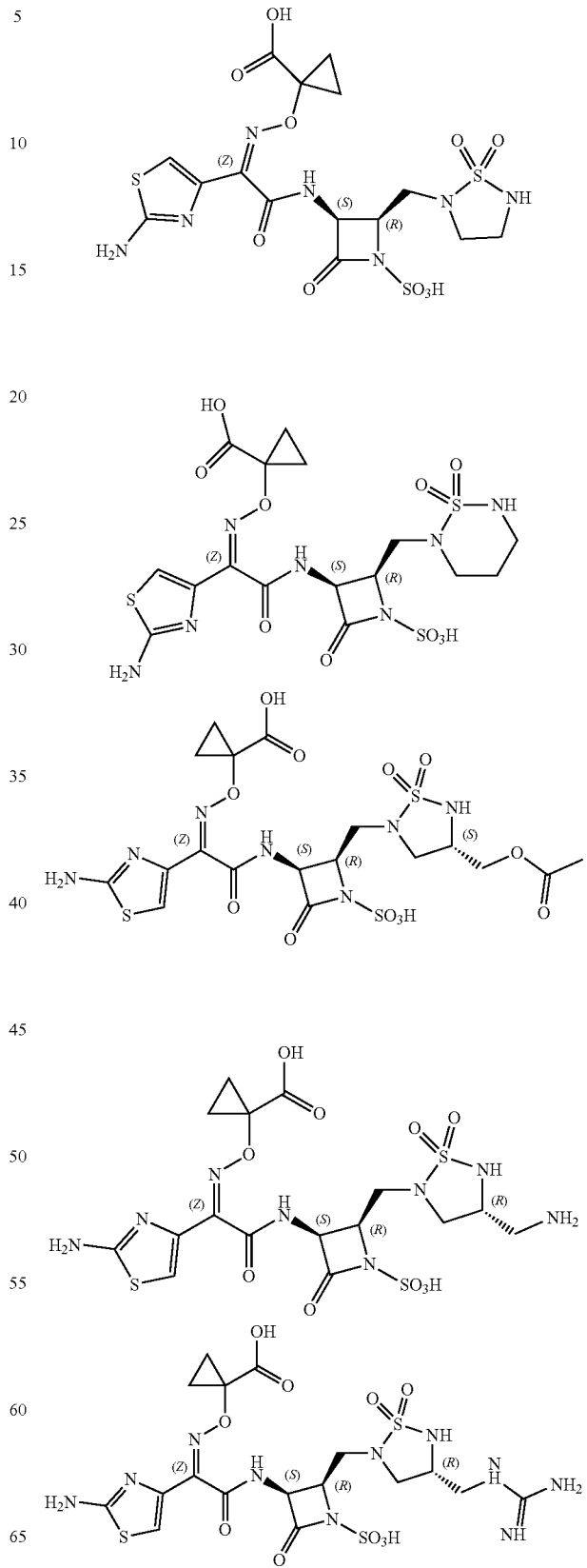

-continued
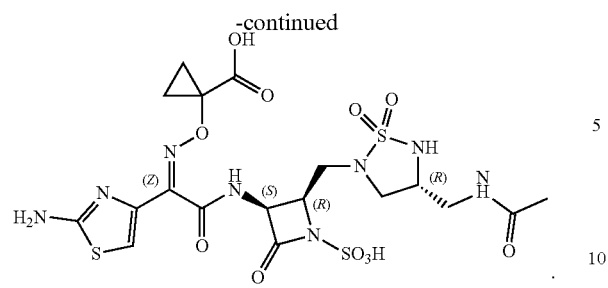

What is claimed is:

1. A compound of formula (I), a stereoisomer thereof or a pharmaceutically acceptable salt thereof,

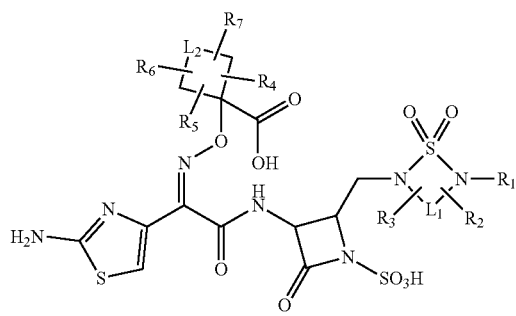

(I)

Wherein
L$_1$ is selected from —CH$_2$CH$_2$—, —CH$_2$CH$_2$CH$_2$—, —C(=O)CH$_2$—, —C(=O)CH$_2$CH$_2$—, and —CH$_2$C(=O)CH$_2$—;
L$_2$ is selected from a single bond and —CH$_2$—;
R$_1$ is selected from H, CN, and C$_{1-3}$ alkyl, wherein C$_{1-3}$ alkyl is optionally substituted with one, two or three R$_a$;
R$_2$ and R$_3$ are each independently selected from H, OH, C$_{1-6}$ alkyl, C$_{1-6}$ alkoxy, —CH$_2$—O—C(=O)—C$_{1-3}$ alkyl, —CH$_2$—NH—C$_{1-3}$ alkyl, —CH$_2$—NH—C(=NH)NH$_2$, and —CH$_2$—NH—C(=O)—C$_{1-3}$ alkyl, wherein C1-6 alkyl, C1-6 alkoxy, —CH$_2$—O—C(=O)—C1-3 alkyl, —CH$_2$—NH—C1-3 alkyl, —CH$_2$—NH—C(=NH)NH$_2$, and —CH$_2$—NH—C(=O)—C$_{1-3}$ alkyl are optionally substituted with one, two or three R$_b$;
R$_4$, R$_5$, R$_6$, and R$_7$ are each independently selected from H, F, Cl, Br, I, CH$_3$, CH$_2$CH$_3$, CF$_3$, CHF$_2$, and CH$_2$F;
R$_a$ and R$_b$ are each independently selected from F, Cl, Br, I, OH, CN, COOH, CH$_3$, CH$_2$CH$_3$, CH$_2$CH$_2$CH$_3$, CH(CH$_3$)$_2$, OCH$_3$, OCF$_3$, CHF$_2$, CH$_2$F, and NH$_2$.

2. The compound, the stereoisomer thereof or the pharmaceutically acceptable salt thereof according to claim 1, wherein R1 is selected from H, CN, and CH$_3$.

3. The compound, the stereoisomer thereof or the pharmaceutically acceptable salt thereof according to claim 1, wherein R$_2$ and R$_3$ are each independently selected from H, OH, C$_{1-3}$ alkyl, C$_{1-3}$alkoxy,

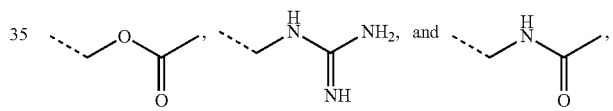

wherein C$_{1-3}$ alkyl, C$_{1-3}$ alkoxy,

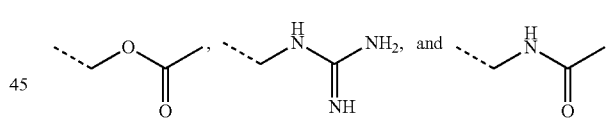

are optionally substituted with one, two and three Rb.

4. The compound, the stereoisomer thereof or the pharmaceutically acceptable salt thereof according to claim 3, wherein R$_2$ and R$_3$ are each independently selected from H, CH$_3$,

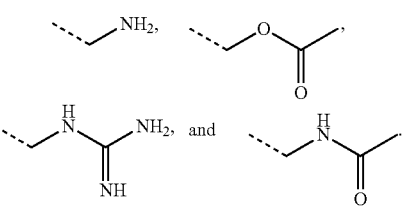

5. The compound, the stereoisomer thereof or the pharmaceutically acceptable salt thereof according to claim 1, wherein the structural unit

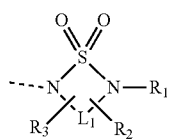

is selected from

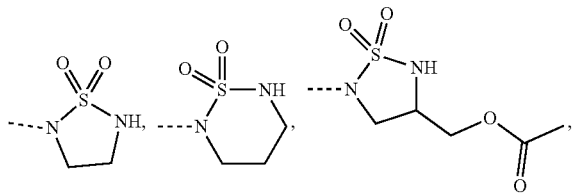

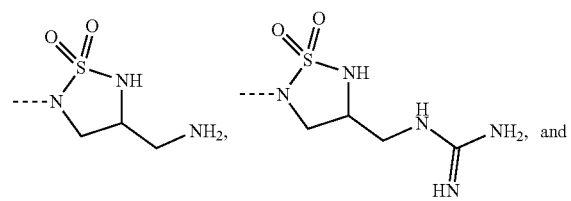

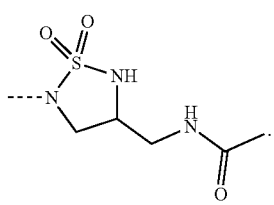

6. The compound, the stereoisomer thereof or the pharmaceutically acceptable salt thereof according to claim 1, wherein the structural unit

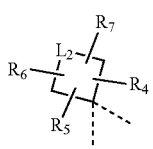

is selected from

7. The compound, the stereoisomer thereof or the pharmaceutically acceptable salt thereof according to claim 1, wherein the compound is selected from

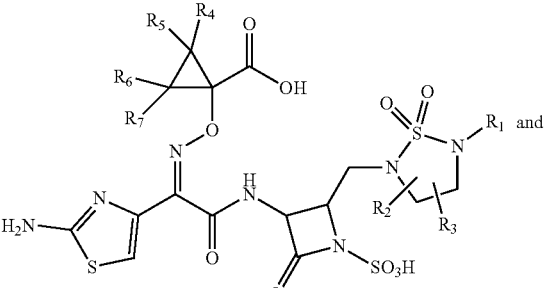
(I-1)

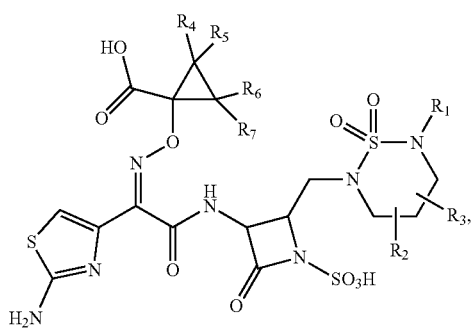
(I-2)

wherein $R_1$, $R_2$, $R_3$, $R_4$, $R_5$, $R_6$, and $R_7$ are as defined in claim 1.

8. The compound, the stereoisomer thereof or the pharmaceutically acceptable salt thereof according to claim 7, wherein the compound is selected from

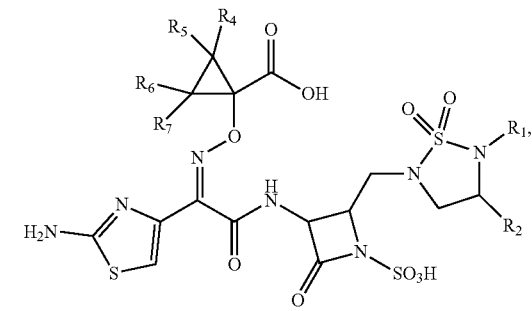
(I-3)

wherein $R_1$, $R_2$, $R_3$, $R_4$, $R_5$, $R_6$, and $R_7$ are as defined in claim 7.

9. A compound of the following formula, a stereoisomer thereof or a pharmaceutically acceptable salt thereof, which is selected from: